United States Patent
Kuwamura et al.

(10) Patent No.: US 8,949,681 B2
(45) Date of Patent: Feb. 3, 2015

(54) CORRECTION APPARATUS, CORRECTION METHOD, AND COMPUTER PRODUCT

(75) Inventors: Shinya Kuwamura, Kawasaki (JP); Atsushi Ike, Minato (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/535,826

(22) Filed: Jun. 28, 2012

(65) Prior Publication Data

US 2013/0047050 A1    Feb. 21, 2013

(30) Foreign Application Priority Data

Aug. 18, 2011    (JP) ................. 2011-179250

(51) Int. Cl.
*G06F 11/07* (2006.01)
*G06F 9/44* (2006.01)
*G06F 11/34* (2006.01)

(52) U.S. Cl.
CPC .............. *G06F 8/30* (2013.01); *G06F 11/0757* (2013.01); *G06F 11/3409* (2013.01); *G06F 11/3457* (2013.01); *G06F 2201/865* (2013.01); *G06F 2201/88* (2013.01); *Y02B 60/165* (2013.01)
USPC ................... 714/746; 714/E11.023; 713/503

(58) Field of Classification Search
CPC ... H04L 1/0045; H04L 1/0057; H04L 1/0061; H04L 1/0071; H04L 63/0428; G11B 20/18; G06F 21/6218; G06F 21/10; G06F 2221/2107; G06F 21/64
USPC ............................ 714/746, E11.023; 713/503
See application file for complete search history.

(56) References Cited

U.S. PATENT DOCUMENTS

| | | | | |
|---|---|---|---|---|
| 5,941,980 A | * | 8/1999 | Shang et al. | 712/204 |
| 6,430,696 B1 | * | 8/2002 | Keeth | 713/503 |
| 2009/0112518 A1 | * | 4/2009 | Armstrong et al. | 702/182 |

FOREIGN PATENT DOCUMENTS

| | | | |
|---|---|---|---|
| JP | 9-006646 A | 1/1997 | |
| JP | 2009-301505 | * 12/2009 | G06F 17/50 |

OTHER PUBLICATIONS

Machine Translation of JP 2009-301505 A.*

* cited by examiner

*Primary Examiner* — Albert Decady
*Assistant Examiner* — Kyle Vallecillo
(74) *Attorney, Agent, or Firm* — Fujitsu Patent Center

(57) ABSTRACT

A correction apparatus includes an acquirer that acquires the execution time of an instruction in a given block among a block group that includes blocks obtained by dividing program code; a detector that detects a first resource group designated by a tail instruction in a preceding block that is executed before the given block and a second resource group designated by a head instruction of the given block; an identifier that identifies a resource common to the first and the second resource groups; a calculator that from the time when the identified resource is used by the head instruction and the time when use of the identified resource by the tail instruction ends, calculates a delay period caused by the preceding block; a corrector that based on the calculated delay period, corrects the acquired execution time; and an output device that outputs the corrected execution time.

13 Claims, 21 Drawing Sheets

FIG.4

```
                                        401
        ⋮
402 — LD      r2,   [r1];        //r2←[r1]
403 — MULT    r5,   r3,    r4;   //r5←r3*r4
404 — ADD     r6,   r2,    r5;   //r6←r2+r5
        ⋮
```

FIG.5

TIMING INFORMATION — 351

| INST-RUCTION TYPE | SOURCE REGISTER | DESTINATION REGISTER | PENALTY |
|---|---|---|---|
| LD | rs1:e1 | rd:e2 | CACHE MISS: 6 |
| MULT | rs1:e1, rs2:e2 | rd:e3 | - |
| ADD | rs1:e1, rs2:e1 | rd:e2 | - |
| ⋮ | ⋮ | ⋮ | ⋮ |

| ARITHMETIC UNIT NAME | CORRECTION VALUE | COUNT |
|---|---|---|
| INTEGER ARITHMETIC UNIT | 1 | 2 |
| INTEGER MULTIPLIER UNIT | 3 | 1 |
| LOAD UNIT | 2 | 1 |
| STORE UNIT | 1 | 1 |

ARITHMETIC UNIT INFORMATION ~354

354-1, 354-2, 354-3, 354-4

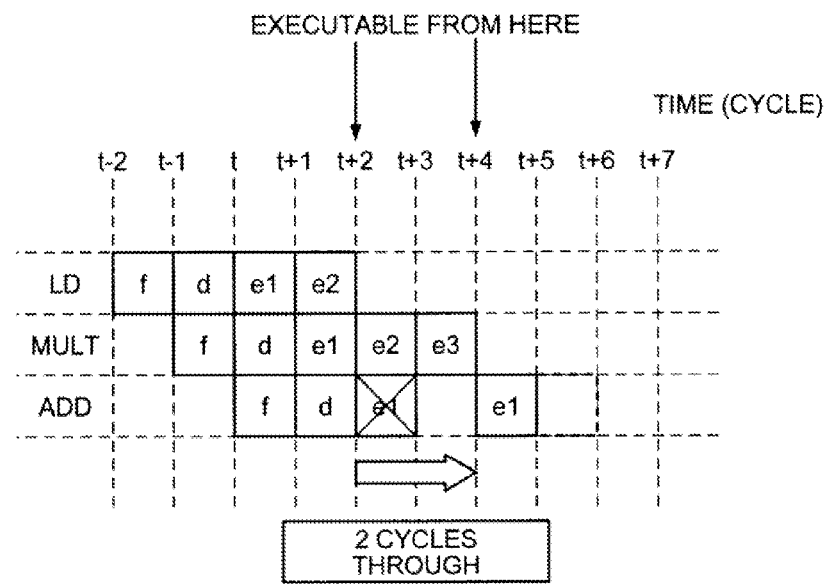
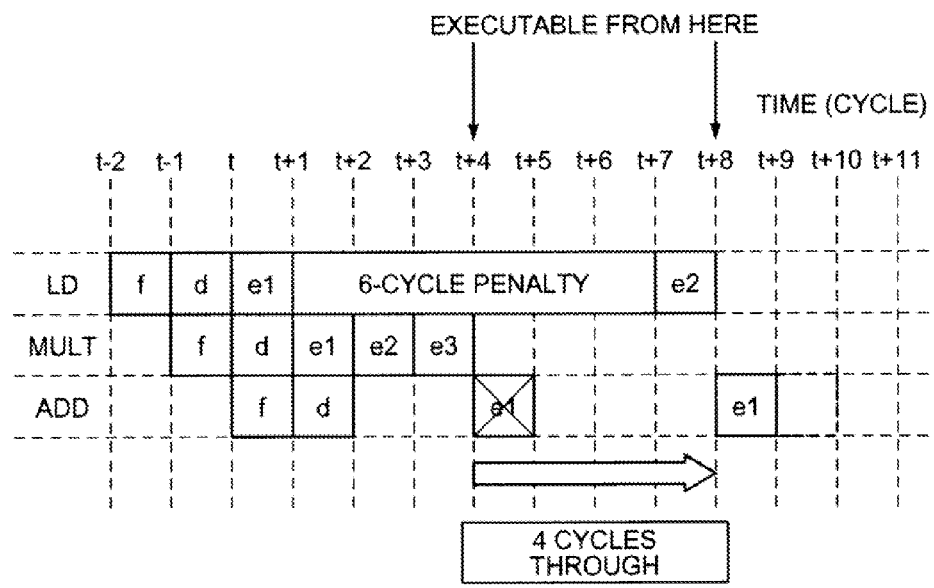

HOST CODE
(FUNCTION CODE)

HOST CODE (FUNCTION CODE+CODE FOR CYCLE SIMULATION)

```
cache_ld(address, rep_delay, pre_delay){
            avail_delay=0;
            if(pre_delay < current_time - preld_time)
                        avail_delay = pre_delay - current_time + preld_time;
            cache_lookup( address );
            if(cache_hit){
                        cache_update_onhit( address );
            } else {
                        cache_update_onmiss( address );
                        avail_delay += cache_miss_latency;
                        if(rep_delay < avail_delay)
                                    avail_delay -= avail_delay - rep_delay;
            }
            preld_time = current_time;
}
```

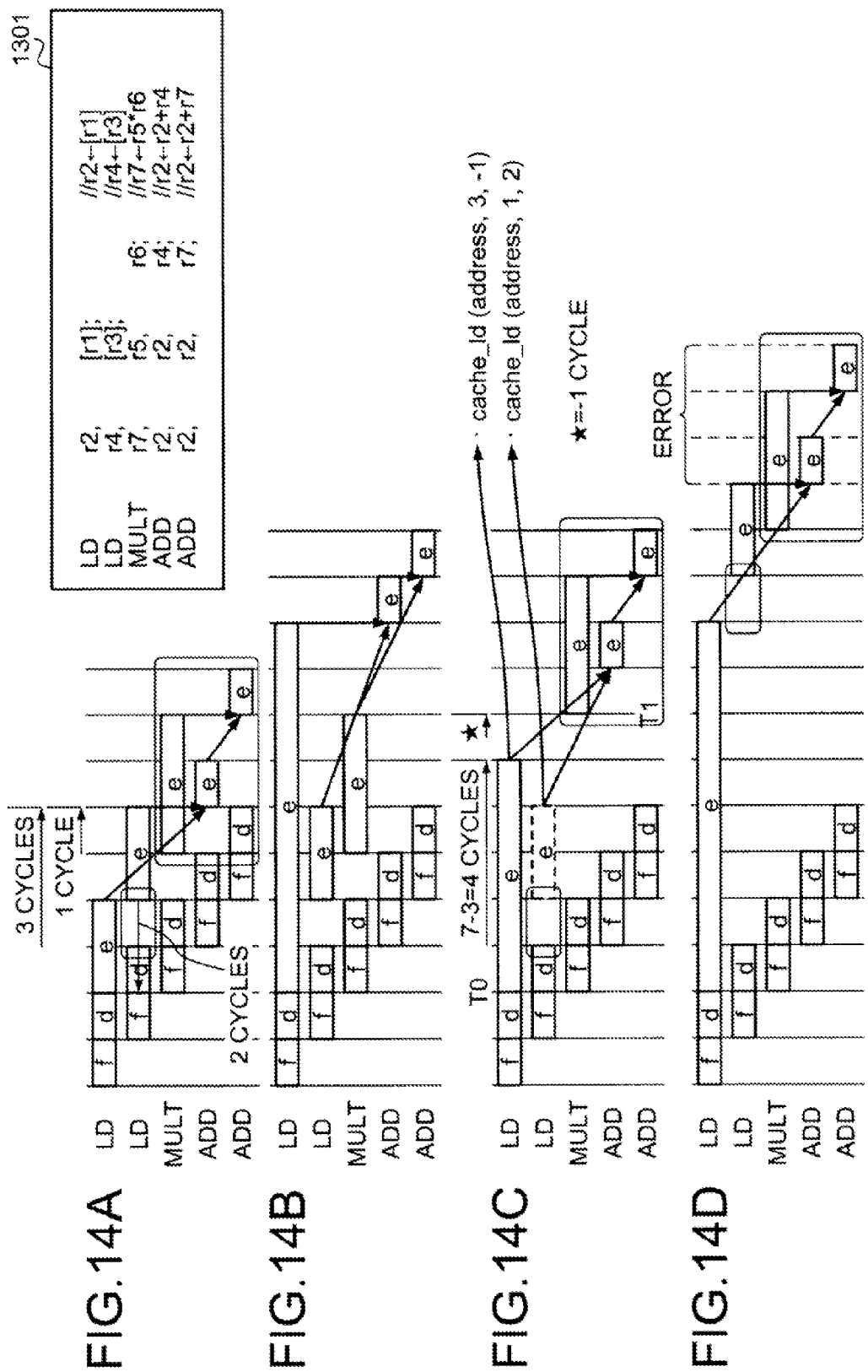

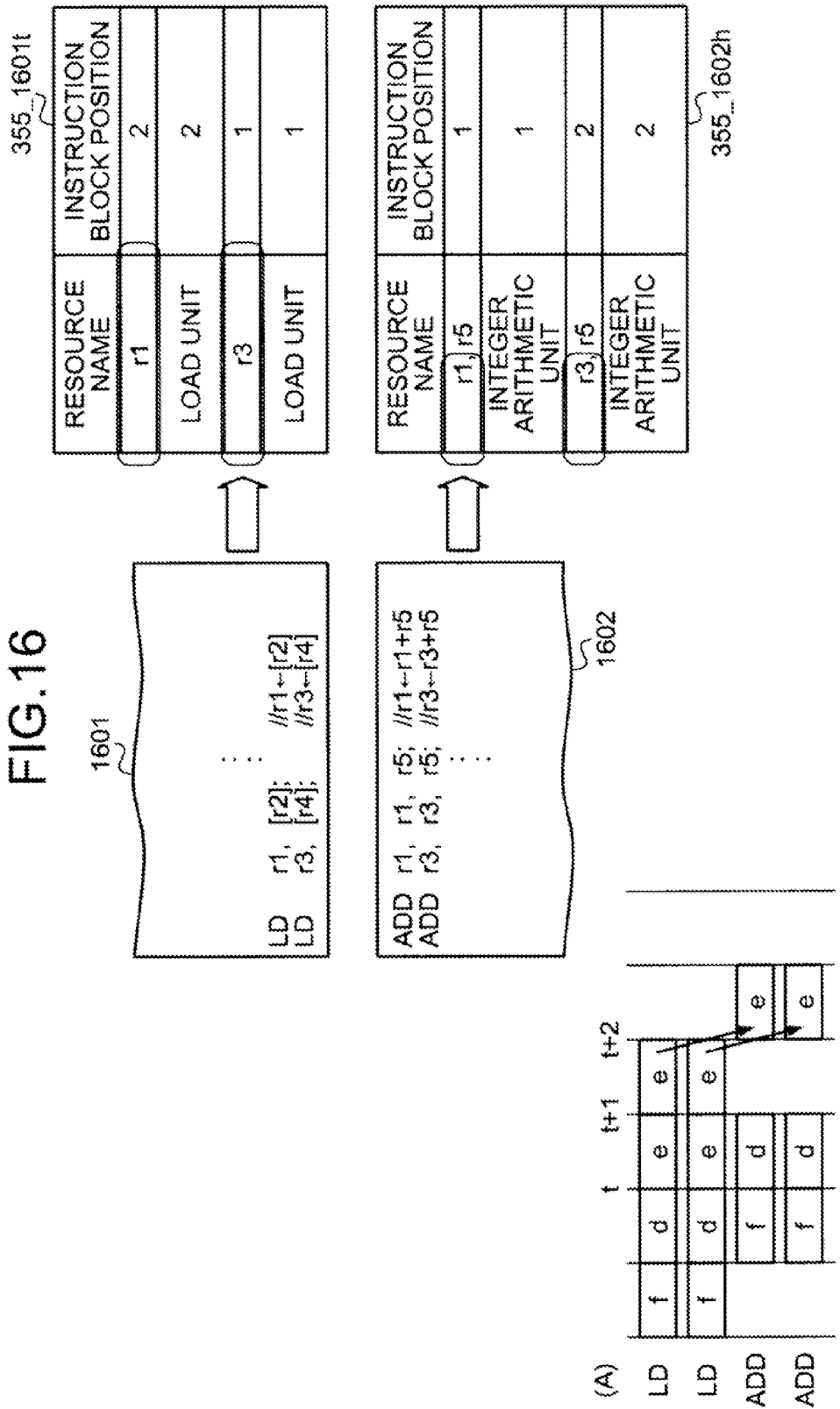

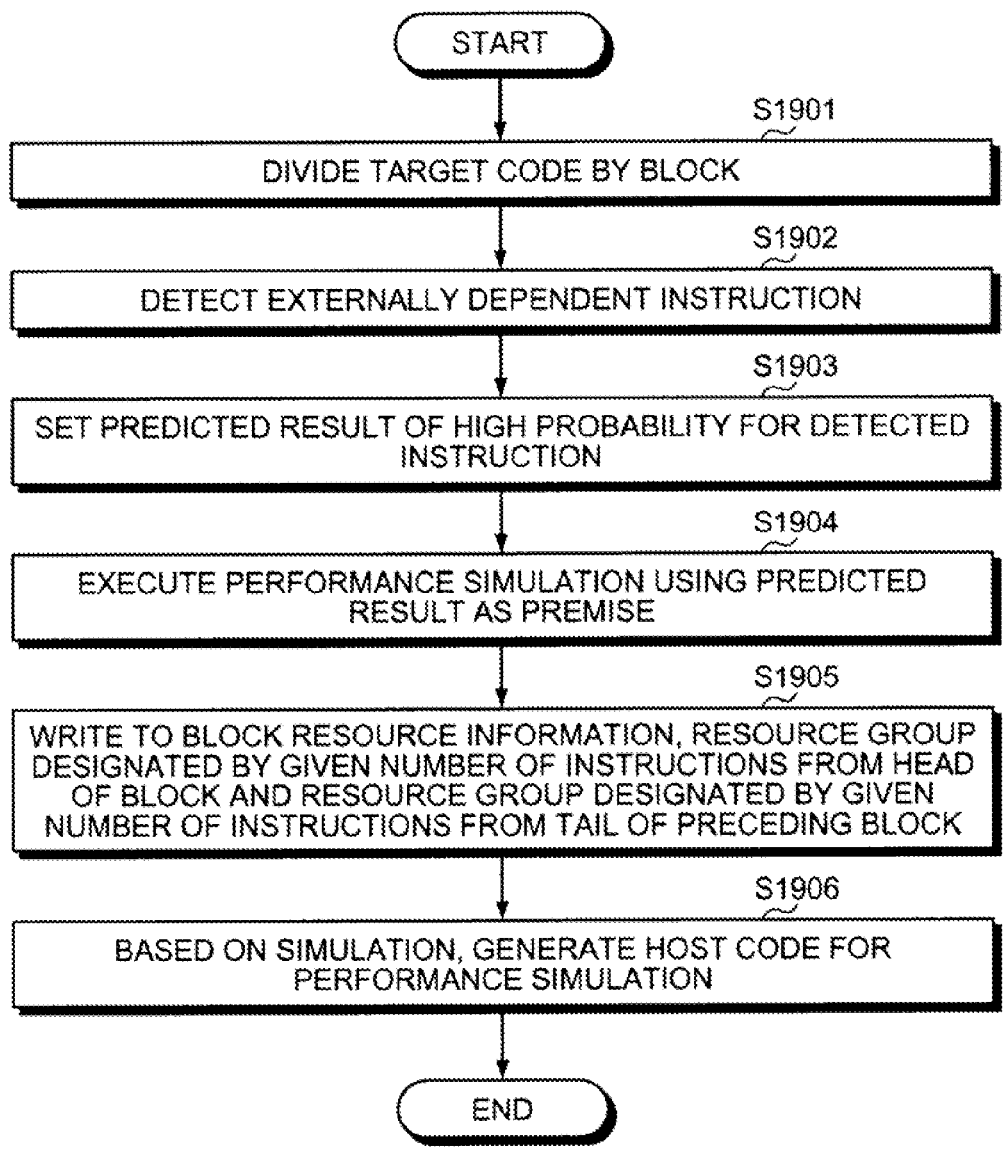

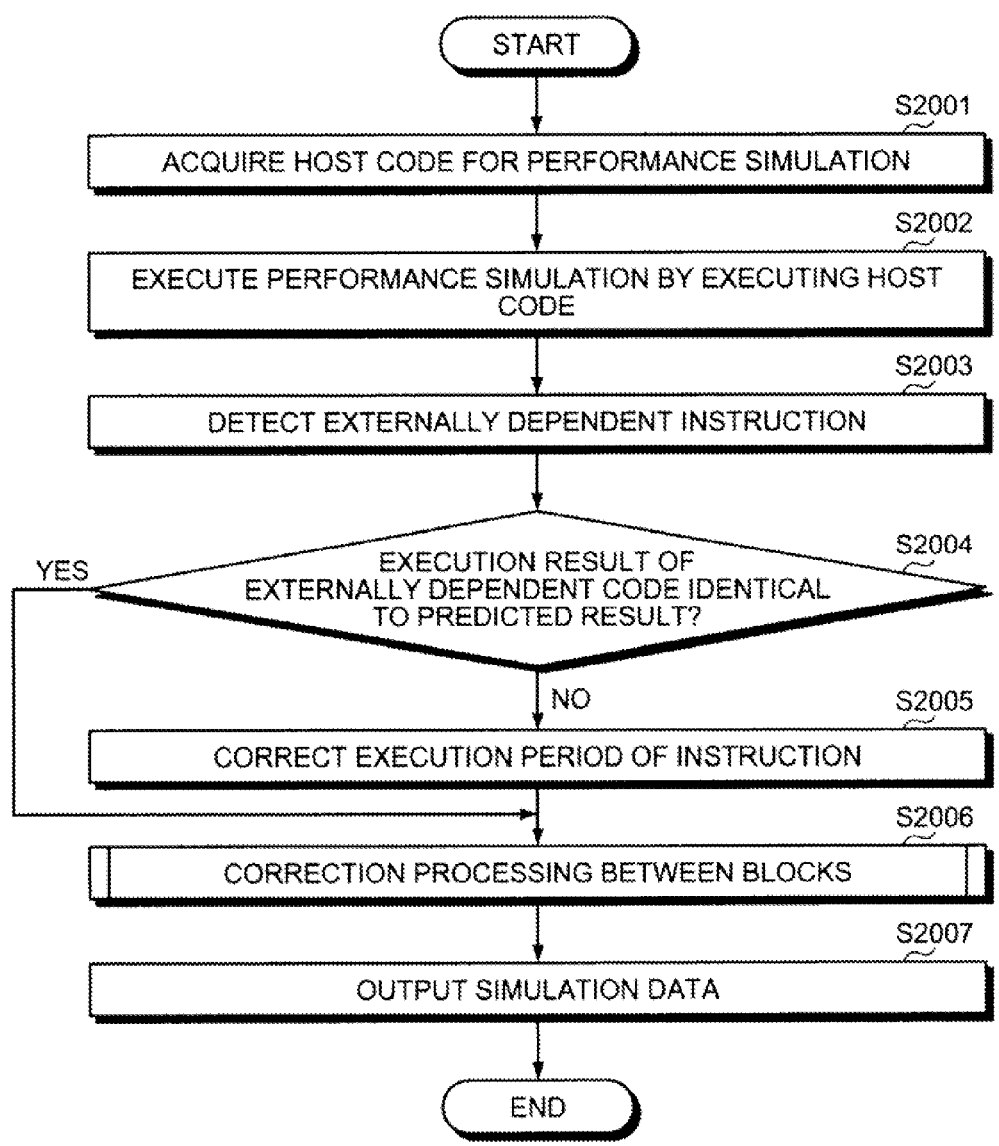

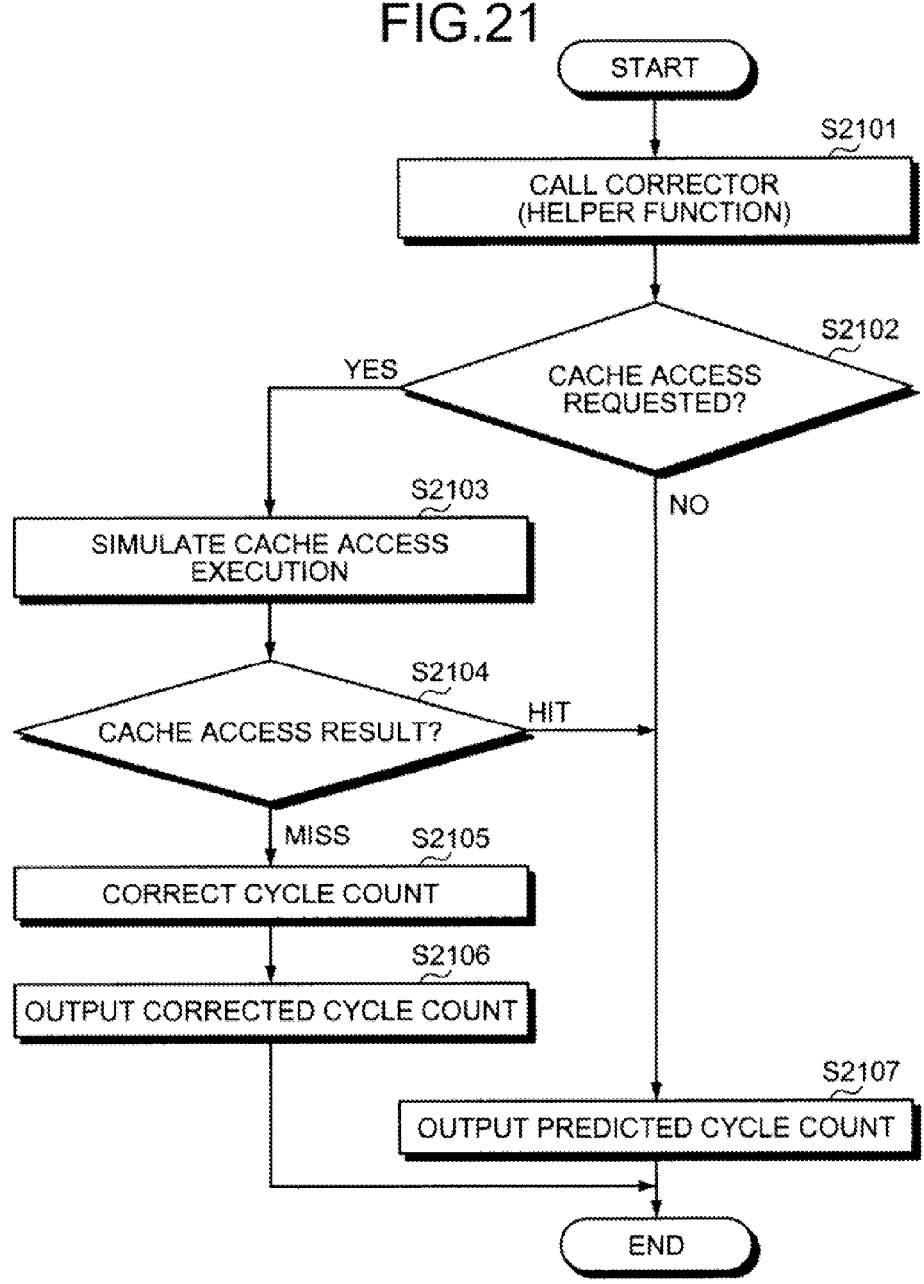

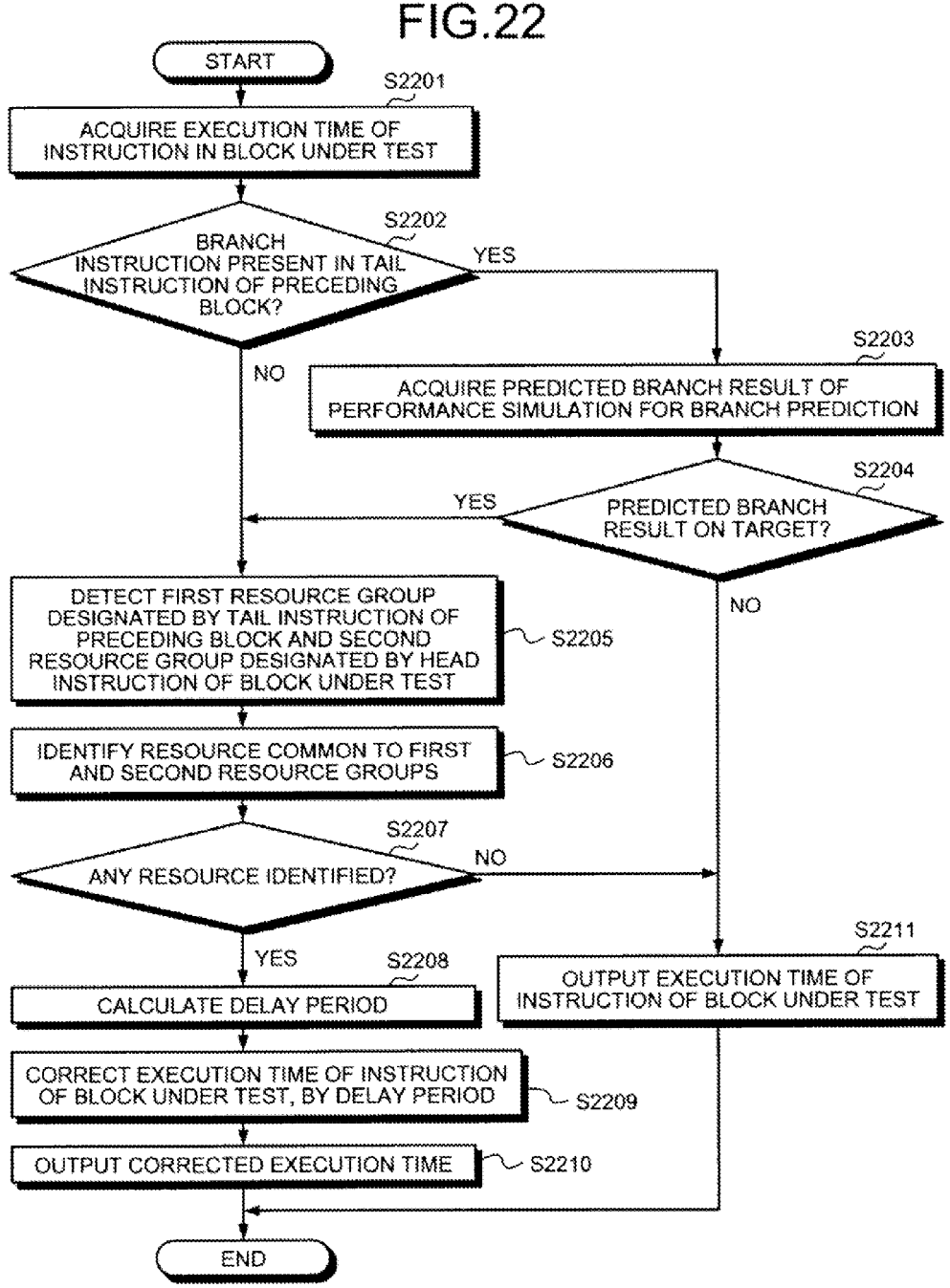

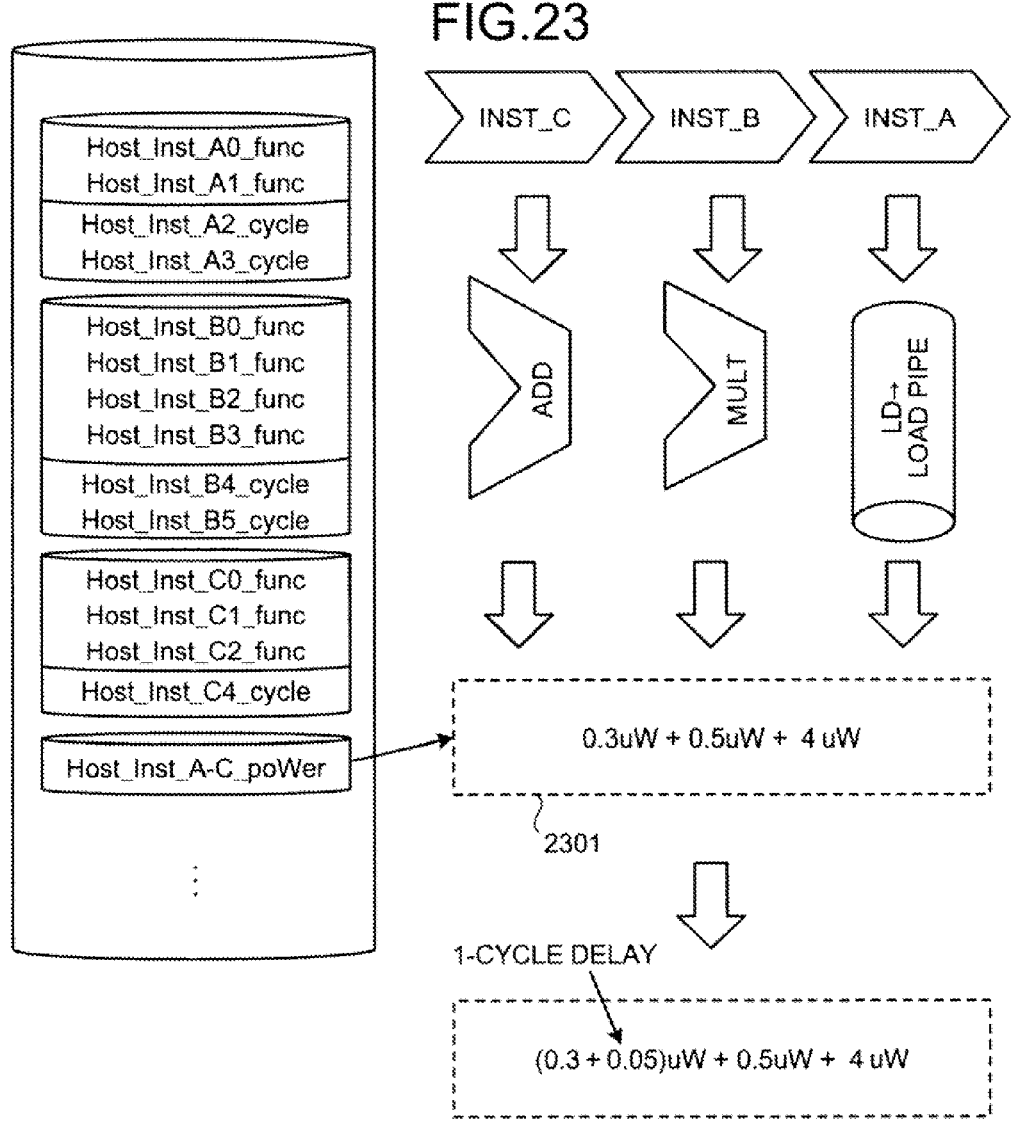

CORRECTION APPARATUS, CORRECTION METHOD, AND COMPUTER PRODUCT

CROSS REFERENCE TO RELATED APPLICATIONS

This application is based upon and claims the benefit of priority of the prior Japanese Patent Application No. 2011-179250, filed on Aug. 18, 2011, the entire contents of which are incorporated herein by reference.

FIELD

The embodiments discussed herein are related correction apparatus, correction method, and computer product that correct simulation results.

BACKGROUND

Conventionally, technology that simulates the functions and performance of central processing units (CPUs) has been disclosed. For example, technology exists that converts program code so that operations can be executed at a host CPU that executes simulations for a target CPU subject to evaluation, thereby simulating the functions, performance, and power consumption of the target CPU.

For example, technology exists where before simulation, the code of the target CPU is converted into host code that enables direct execution thereof in units of subroutines by a host computer and registers that are used between the in and the out of blocks, which are obtained by separating the code into units of subroutines, are analyzed. See, for example, Japanese Laid-Open Patent Publication No. H9-6646.

Nonetheless, with the conventional technologies above, since simulation is executed for each block, if simulation is executed for multiple blocks successively, the simulation results are inaccurate and deviate from actual execution results.

SUMMARY

According to an aspect of an embodiment, a correction apparatus includes an acquirer that acquires the execution time of an instruction in a given block among a block group that includes blocks obtained by dividing program code; a detector that detects a first resource group designated by a tail instruction in a preceding block that is executed before the given block and a second resource group designated by a head instruction of the given block; an identifier that identifies a resource common to the detected first resource group and the detected second resource group; a calculator that from the time when the identified resource is used by the head instruction and the time when use of the identified resource by the tail instruction ends, calculates a delay period caused by the preceding block; a corrector that based on the calculated delay period, corrects the acquired execution time of the instruction in the given block; and an output device that outputs the corrected execution time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram depicting an example of target code.

FIG. 5 is a diagram depicting an example of timing information.

FIG. 8 is a diagram depicting an example of arithmetic unit information.

FIGS. 9A and 9B are diagrams depicting execution timing of a target program.

FIG. 11 is a diagram depicting an example of process code of a first corrector.

FIGS. 14A, 14B, 14C, and 14D are diagrams depicting third correction examples of execution results by the first corrector.

FIG. 16 is a diagram depicting a second correction example of execution results by the second corrector.

FIG. 19 is a flowchart of an example of code converter processing.

FIG. 20 is a flowchart of an example of simulation executor processing.

FIG. 21 is a flowchart of a first simulation result correction process.

FIG. 22 is a flowchart of a second simulation result correction process.

FIG. 23 is a diagram depicting an example of correction by the simulation apparatus according to a second embodiment.

DESCRIPTION OF EMBODIMENTS

Preferred embodiments of the present invention will be explained with reference to the accompanying drawings. An example of a correction apparatus according to the embodiments will be described and a state is assumed where a simulation apparatus that performs simulation of a target CPU executes correction processing according to the embodiments.

Figure 1:
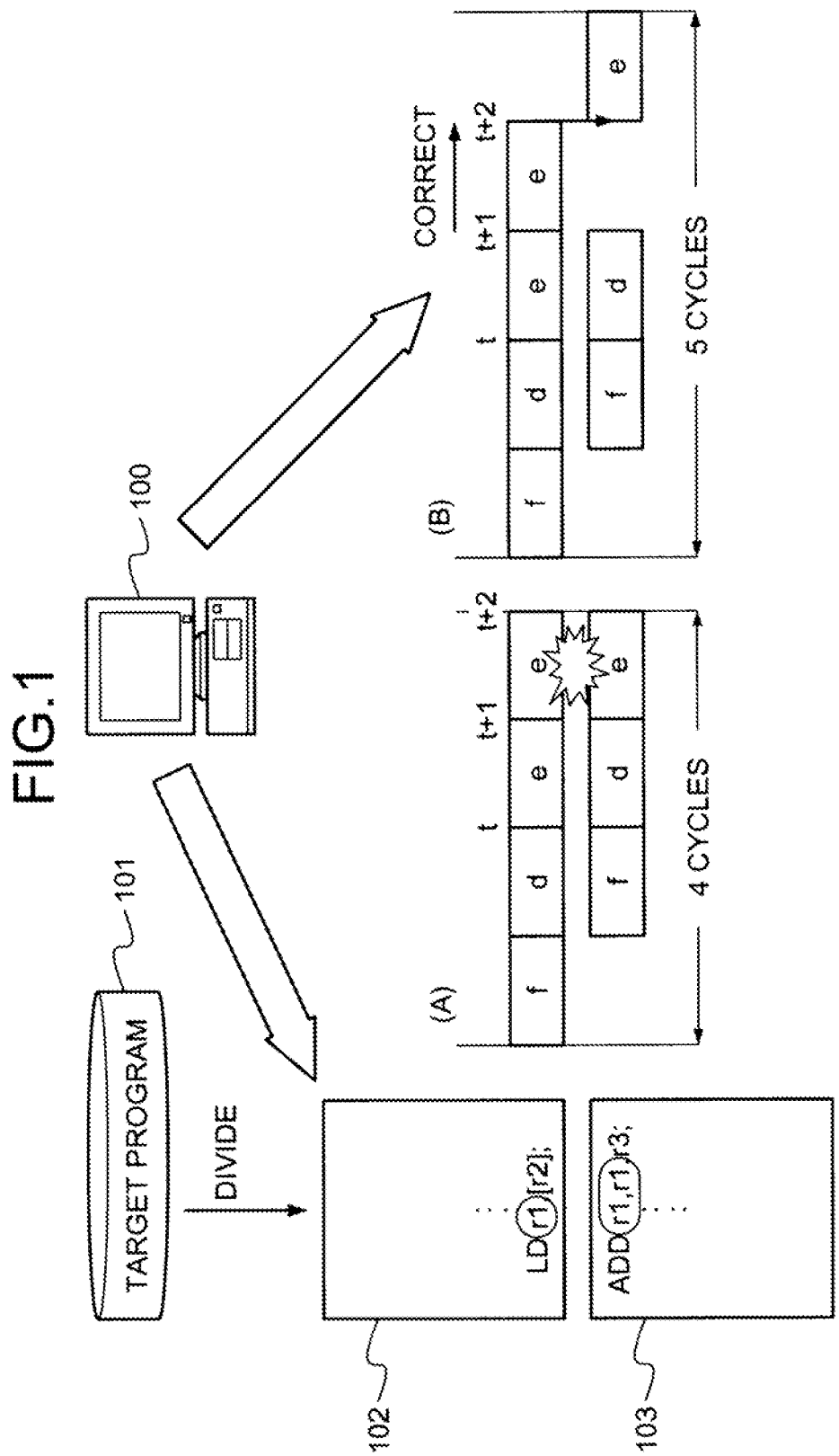
FIG. 1 is a diagram depicting an operation example of a simulation apparatus according to a first embodiment.

FIG. 1 is a diagram depicting an operation example of a simulation apparatus according to a first embodiment. A simulation apparatus 100 executes performance simulation of instruction execution by a target CPU. For instance, since a target program 101 for the target CPU is run on a host CPU, the simulation apparatus 100 uses an interpreting scheme. Further, the simulation apparatus 100 generates host code by a just-in-time (JIT) compiling scheme and executes the host code.

Here, the target CPU is a control model of the CPU that is subject to simulation. The simulation apparatus 100 outputs cycle simulation information for each instruction as a performance simulation of instruction execution by the target CPU.

Here, the target CPU is a reduced instruction set computer (RISC) architecture CPU adopted in, for example, embedded systems. The simulation apparatus 100, which corresponds to the host CPU, for example, is a computer having a complex instruction set computer (CISC) architecture CPU.

With this configuration, the simulation apparatus 100 successively simulates block 102 and block 103, which are obtained by separating the target program 101 into given blocks. The tail instruction of block 102 is a load instruction (LD instruction) and mnemonic code is "LD r1,[r2]". Further, the head instruction of block 103 is an addition instruction (ADD instruction) and mnemonic code is "ADD r1,r1,r3". The LD instruction and the ADD instruction are inserted into the pipeline of the target CPU and executed.

With reference to FIG. 1, description will be given concerning (A) a simulation result before correction processing according to the embodiments is performed and (B) a simulation result after the correction processing is performed. Concerning the simulation results, the LD instruction and the ADD instruction sequentially execute a fetch stage (depicted as "f" and referred to hereinafter as f-stage), a decode stage (depicted as "d" and referred to hereinafter as d-stage), and an execute stage (depicted as "e" and referred to hereinafter as e-stage). The f-stage and the d-stage are performed for 1 cycle, irrespective of the instruction. The e-stage is performed for 2 cycles in the case of the LD instruction and for 1 cycle in the case of the ADD instruction. Further, the execution time of the e-stage of the LD instruction is assumed to be t.

The simulation result depicted at (A) in FIG. 1 depicts processing from the start of the LD instruction to the completion of the ADD instruction, performed over 4 cycles. However, at t+1, register r1 conflicts and if the target CPU actually performs processing, the execution time of the e-stage of the ADD instruction is t+2. Since the simulation result depicted at (A) in FIG. 1 differs from actual performance, the accuracy of the simulation result is poor.

The simulation result depicted at (B) in FIG. 1 is for a state where the difference of time t+1 when r1 is used by the ADD instruction before correction and time t+2 when the use of r1 by the LD instruction ends (1 cycle) is calculated as a delay period and the execution time of the e-stage of the ADD instruction is corrected. In (B) of FIG. 1, the simulation result depicts processing from the start of the LD instruction to the completion of the ADD instruction, performed over 5 cycles; is identical to actual execution times; and has improved accuracy.

Thus, the correction processing according to the embodiments uses a delay period obtained based on the time when a resource is used by the head instruction of a subsequent block and, the time when use of the resource by a preceding block ends and the resource becomes available for use by the subsequent block; and performs correction. Hereinafter, with reference to FIG. 2 to FIG. 22 the simulation apparatus 100 performing the operations depicted in FIG. 1 will be described.

Figure 2:
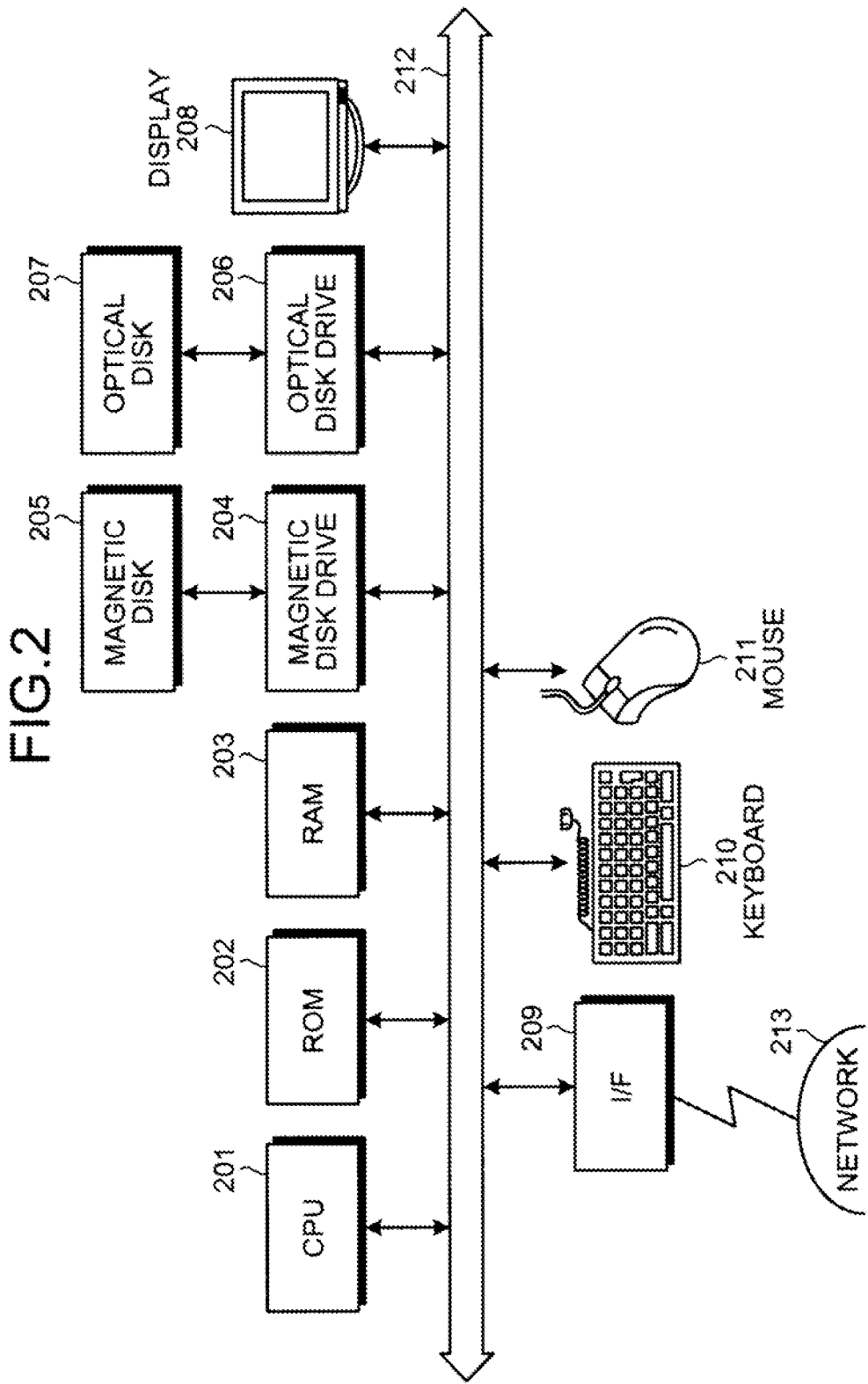
FIG. 2 is a block diagram depicting an example of a hardware configuration of the simulation apparatus.

FIG. 2 is a block diagram depicting an example of a hardware configuration of the simulation apparatus. In FIG. 2, the simulation apparatus 100 includes a central processing unit (CPU) 201, a read-only memory (ROM) 202, a random access memory (RAM) 203, a magnetic disk drive 204, a magnetic disk 205, an optical disk drive 206, and an optical disk 207. The simulation apparatus 100 further includes a display 208, an interface (I/F) 209, a keyboard 210, and a mouse 211 as input and output devices with respect to a user or another device. The respective components are connected by a bus 212.

The CPU 201 governs overall control of the simulation apparatus 100. The ROM 202 stores therein programs such as a boot program. The RAM 203 is used as a work area of the CPU 201. The magnetic disk drive 204, under the control of the CPU 201, controls the reading and writing of data with respect to the magnetic disk 205. The magnetic disk 205 stores therein data written under control of the magnetic disk drive 204.

The optical disk drive 206, under the control of the CPU 201, controls the reading and writing of data with respect to the optical disk 207. The optical disk 207 stores therein data written under control of the optical disk drive 206, the data being read by a computer. Any of the storage devices including ROM 202, the magnetic disk 205, and the optical disk 207 may store therein the simulation program according to the embodiments.

The display 208 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 208.

The I/F 209 is connected to a network 213 such as a local area network (LAN), a wide area network (WAN), and the Internet through a communication line and is connected to other apparatuses through the network 213. The I/F 209 administers an internal interface with the network 213 and controls the input/output of data from/to external apparatuses. For example, a modem or a LAN adaptor may be employed as the I/F 209.

The keyboard 210 includes, for example, keys for inputting letters, numerals, and various instructions and performs the input of data. A touch-panel-type input pad or numeric keypad, etc. may be adopted. The mouse 211 is used to move the cursor, select a region, or move and change the size of windows. A track ball or a joy stick may be adopted provided each respectively has a function similar to a pointing device.

Figure 3:
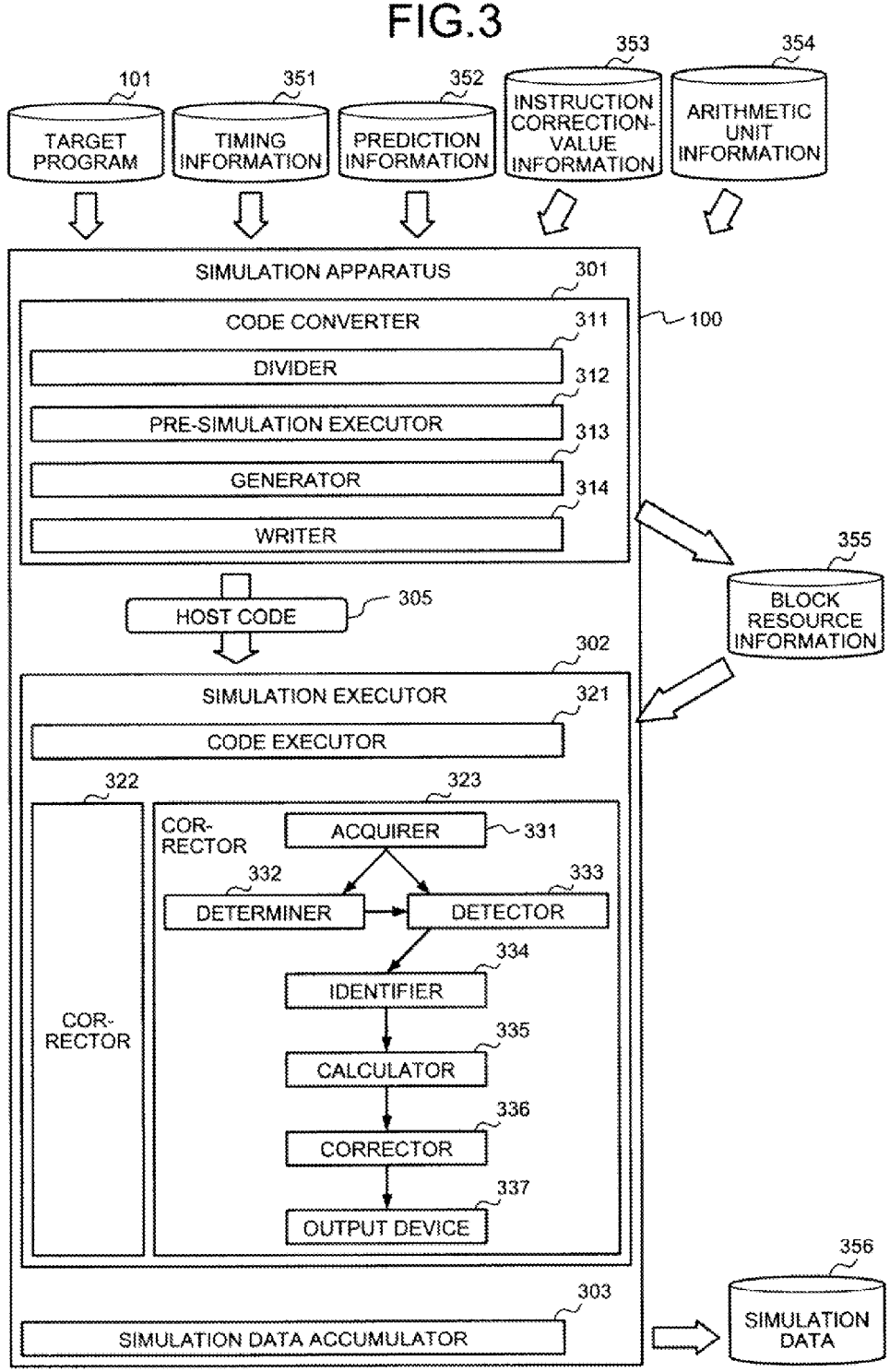
FIG. 3 is a block diagram depicting an example of a functional configuration of the simulation apparatus.

Functions of the simulation apparatus 100 will be described. FIG. 3 is a block diagram depicting an example of a functional configuration of the simulation apparatus. The simulation apparatus 100 includes a code converter 301, a simulation executor 302, and a simulation data accumulator 303. These functions (the code converter 301 to the simulation data accumulator 303) forming a controller are implemented by executing on the CPU 201, a program stored in a storage device. A storage device, for example, is the ROM 202, the RAM 203, the magnetic disk 205, and the optical disk 207 depicted in FIG. 2. Further, the functions may be implemented by executing a program on another CPU, via the I/F 209.

The code converter 301 includes a divider 311, a pre-simulation executor 312, a generator 313, and a writer 314. The simulation executor 302 includes a code executor 321, a corrector 322 that is a first corrector, and a corrector 323 that is a second corrector. The corrector 323 includes an acquirer 331, a determiner 332, a detector 333, an identifier 334, a calculator 335, a corrector 336, and an output device 337.

The simulation apparatus 100 has access to the target program 101, timing information 351, prediction information 352, instruction correction-value information 353, arithmetic unit information 354, block resource information 355, and simulation data 356, which are respectively stored in a storage area accessible to the simulation apparatus 100.

The block resource information 355 is information recording for each combination of a block and head or tail instruction, resources designated by the instructions. Here, a resource is a register and/or memory that is to be written to or read from, and/or an arithmetic unit that is to be executed.

According to the notation convention hereinafter, block resource information 355 appended with a tail indicator "_xxxt" is the tail instruction of blockxxx and stores a designated resource group. Further, block resource information 355 appended with a head indicator "_xxxh" is the head instruction of blockxxx and stores a designated resource group.

At the time of execution of a program of the target CPU, the code converter 301 generates from the target program 101, which is executed by the target CPU, a host code 305 of the host CPU, which executes simulation.

The divider 311 divides the target program 101 into given blocks. The unit of the blocks is, for example, a general basic block unit (code from a branch point to the next branch point), or an arbitrary code unit that is preliminarily determined.

The pre-simulation executor 312 obtains the timing information 351 and the prediction information 352, and performs performance simulation that involves executing an input block under conditions assumed from an execution result. For instance, the pre-simulation executor 312, based on the prediction information 352, sets a predicted result for an externally dependent instruction included in the input block. The pre-simulation executor 312 refers to the timing information 351, executes instructions assumed from the set predicted result, and simulates the progress of the instruction execution. The pre-simulation executor 312 obtains, as a simulation result, the execution period (cycle count) of each instruction included in the block.

The generator 313, based on the simulation result of the pre-simulation executor 312, generates, as a host code corresponding to the processed block, a host code for simulating performance when instructions in the set predicted result are executed.

The generator 313, based on a target code of the block, generates a host code that performs instruction execution that is for a case when an externally dependent instruction results in a predicted result, and further embeds a simulation code that performs processing of summing the execution period of each instruction and calculating the processing period of the block.

For example, in the case of a process for which "cache hit" has been set as the predicted result for data concerning an LD instruction, the generator 313 simulates execution of processing performed when cache access consequent to an LD instruction in the block results in a "hit", and obtains the execution period for the predicted result. The generator 313 further generates a host code that performs processing of obtaining the execution period of processing performed when cache access consequent to the LD instruction results in a "miss", by a correction calculation that uses addition/subtraction of the execution period in the case of "hit" for the predicted result.

The writer 314 writes to the block resource information 355, the resource group designated by a given number of instructions from the head of the block and the resource group designated by a given number of instructions from the tail of the block.

The simulation executor 302 performs a function of executing the host code 305 generated by the generator 313 and of performing the instruction execution of the target CPU that executes the target program 101. The code executor 321 uses the host code 305 and executes the target program 101.

During execution of a program, the corrector 322 (first corrector) corrects the execution period of the expected case already obtained, if the execution result of an externally dependent instruction is different from the set predicted result.

The corrector 322 performs correction using a penalty period given to an externally dependent instruction, the execution periods of the instruction executed before and the instruction executed after the externally dependent instruction, the delay period of the previous instruction, etc. The correction processing is described in detail hereinafter. The simulation data accumulator 303 accumulates, as results of performance simulation execution, the simulation data 356, which includes the execution time and the execution period of each instruction.

The corrector 323 (second corrector) performs correction of influences between blocks. The acquirer 331 has a function of acquiring the execution times of instructions in a block that is included in a block group that includes blocks obtained by dividing program code. The execution time of an instruction may be the time at which execution of the instruction begins, or may be the time at which execution ends. In the description hereinafter, the execution time is assumed to be the time at which execution of an instruction begins. For example, the acquirer 331 acquires t+1 as the execution time of the e-stage of the ADD instruction in block 103. The execution times of instructions in a block are generated by the pre-simulation executor 312 and the code executor 321, and are stored to the simulation data 356. Therefore, the acquirer 331 acquires the execution times of the instructions in a block from the simulation data 356.

When the tail instruction is a branch instruction, the acquirer 331 may acquire the predicted branch result for the branch instruction. The predicted branch result is acquired from the code executor 321, which executed the host code 305. Acquisition results are retained in a storage area such as the RAM 203, the magnetic disk 205, and the optical disk 207.

The determiner 332 has a function of determining whether the predicted branch result is on target with the execution result of the simulation, when the tail instruction is a branch instruction. Determination results are retained in a storage area such as the RAM 203, the magnetic disk 205, and the optical disk 207.

The detector 333 has a function of detecting a first resource group designated by the tail instruction of the preceding block that is executed before a given block, and a second resource group designated by the head instruction of the given block. The tail instruction and the head instruction may each be a single instruction, or may be a given number of instructions from the tail of the preceding block and a given number of instructions from the head of the given block, respectively.

When the head and/or tail instruction is a given number of instructions, the number is preliminarily determined based on properties of the target CPU. For example, if the target CPU is a superscalar processor, the number is the number of instructions that can be executed simultaneously. The number may be a count of the cycles for the longest execution period of the e-stage, among the instructions that can be executed by the target CPU. For example, when the cycle count of the longest instruction is 4, the instruction affects up to 3 subsequent instructions and thus, the number is set as 3.

The detector 333 may detect the first and the second resource groups, when the branch prediction of the tail instruction is determined to be on target by the determiner 332. The detector 333 may detect as the first resource group, a storage area group designated by the tail instruction of the preceding block to be written to and may detect as the second resource group, a storage area group designated by the head instruction of the given block to be read from or written to. Criteria for determining, among registers designated by an instruction, which registers are to be written to and which are to be read from are indicated in the timing information 351. Detection results are retained in a storage area such as the RAM 203, the magnetic disk 205, and the optical disk 207.

The identifier 334 has a function of identifying resources common to the first and the second resource groups detected by the detector 333. For example, if the first resource group includes r1 and a load unit and the second resource group includes r1, r3, and an integer arithmetic unit, the identifier 334 identifies r1.

The identifier 334 may identify among common resources, a resource for which the difference of the time when the resource is used by the head instruction and the time when use of the resource by the tail instruction ends is greatest. For example, if r1 and r3 are common resources, the time difference for r1 is 1 cycle and the time difference for r3 is 3 cycles, r3 is identified.

When the common resource is an arithmetic unit and the number of arithmetic units that the CPU to be simulated by program code has is less than the number designated by the tail instruction and the head instruction, the identifier 334 may identify the arithmetic unit. For example, if the target CPU has 1 integer arithmetic unit and, the tail instruction and the head instruction designate 2, the identifier 334 identifies the integer arithmetic unit. Information concerning identified resources is retained in a storage area such as the RAM 203, the magnetic disk 205, and the optical disk 207.

The calculator 335 has a function of calculating the delay period caused by the preceding block, by using the time when the resource identified by the identifier 334 is used by the head instruction and the time when use of the resource by the tail instruction ends. For example, if the time when the identified resource is to be used by the head instruction is time t+1 and the time when use of the resource by the tail instruction ends is time t+3, the calculator 335 calculates the delay period as t+3−(t+1)=2 cycles. Calculation results are retained in a storage area such as the RAM 203, the magnetic disk 205, and the optical disk 207.

The corrector 336 has a function of correcting, for the delay period calculated by the calculator 335, the execution times of the instructions in the given block acquired by the acquirer 331. For example, if the delay period is 2 cycles, the corrector 336 adds 2 cycles to the execution time of the e-stage of the instructions in the given block.

The output device 337 has a function of outputting the corrected execution times of the instructions in the given block. The execution times corrected by the corrector 336 may be output to the simulation data 356, the RAM 203, etc. For example, the output device 337 outputs the instruction execution times to which the delay period was added.

The output device 337 may output the execution times of the instructions in the given block acquired by the acquirer 331, if no resource is identified by the identifier 334.

FIG. 4 is a diagram depicting an example of target code. In FIG. 4, 3 instructions of the target code are depicted. In block 401, 3 target code instructions (instructions 402 to 404) are included. Instruction 402 is an LD instruction and mnemonic code is "LD r2,[r1]". Instruction 403 is a multiplication instruction (MULT instruction) and mnemonic code is "MULT r5,r3,r4". Instruction 403 is an ADD instruction and mnemonic code is "ADD r6,r2,r5". Instructions 402 to 404 are sequentially inserted into the pipeline of the target CPU and block 401 is executed.

Each instruction includes operation code indicating the operation in the instruction and operands subject to the operation. The operation codes of instructions 402 to 404 are LD, MULT, and ADD, respectively; and general registers indicated by r1 to r6 are the operands.

FIG. 5 is a diagram depicting an example of the timing information. The timing information 351 includes information indicating correspondence between each processing element (stage) and available registers at the time of instruction execution and information indicating for each externally dependent instruction among the instructions, a penalty period (penalty cycle count) determining the delay period according to the execution result.

An externally dependent instruction is an instruction (processing) whose execution result is dependent on the external environment outside the target CPU. Processing for which the execution result of an instruction is dependent on the external environment outside the target CPU is, for example, an instruction performing searches of instruction cache, data cache and translation lookaside buffers (TLBs), or processing such as branch prediction and call/return stacking. Load instructions, store instructions, etc. may be an externally dependent instruction. The timing information 351 depicted in FIG. 5 has records 351-1 to 351-3.

The timing information 351 has 4 fields, including an instruction type field, a source register field, a destination register field, and a penalty field. The instruction type field indicates the operation code of an instruction. The source register field indicates registers that are sources of input, among the operands. The destination register field indicates registers that are output destinations, among the operands. The penalty field indicates the delay period according to the execution result.

Record 351-1 indicates that concerning an LD instruction, a source register rs1 (r1) is available as a first processing element (e1) and a destination register rd (r2) is available as a second processing element (e2). Record 351-1 further indicates that when a cache miss occurs, a 6-cycle delay period occurs. "ex" indicates the x-th processing element of the execute stage, among the pipeline stages. "x" is an integer of 1 or greater.

Record 351-2 indicates that in a MULT instruction, the first source register rs1 (r3) is available as a processing element e1, the second source register rs2 (r4) is available as a processing element e2, and the destination register rd (r5) is available as a processing element e3. Record 351-3 indicates that in an ADD instruction, the first source register rs1 (r2) and a second source register rs2 (r5) are available as a processing element e1 and the destination register rd (r6) is available as a first processing element (e1).

Figure 6:
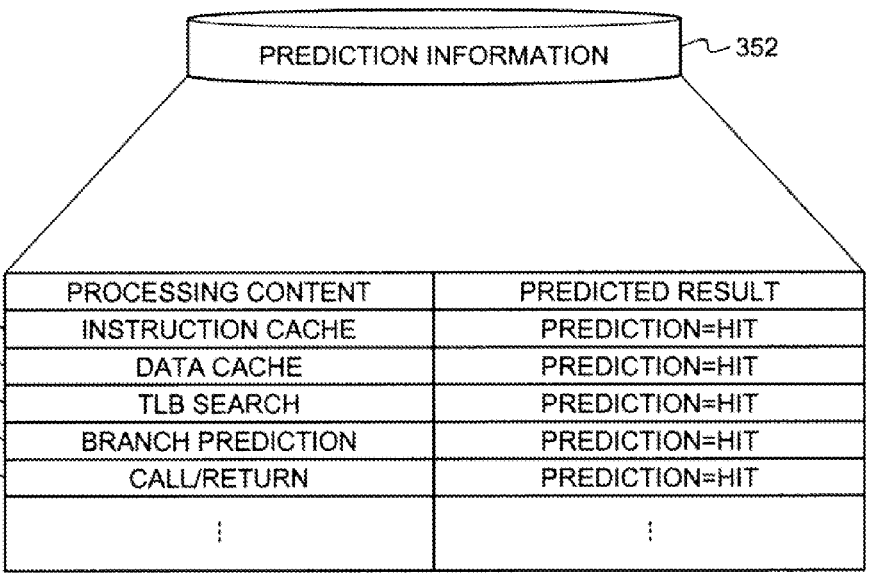
FIG. 6 is a diagram depicting prediction information.

FIG. 6 is a diagram depicting the prediction information. The prediction information 352 has 2 fields, including a processing content field and a predicted result field. The processing content field indicates the processing contents of an externally dependent instruction in the target code. The predicted result field indicates the predicted result of the processing of the externally dependent instruction. The prediction information 352 depicted in FIG. 6 has records 352-1 to 352-5 and, for example, indicates that instruction cache, data cache and TLB searches; branch prediction; and call/return all are predicted to result in hits.

Figure 7:
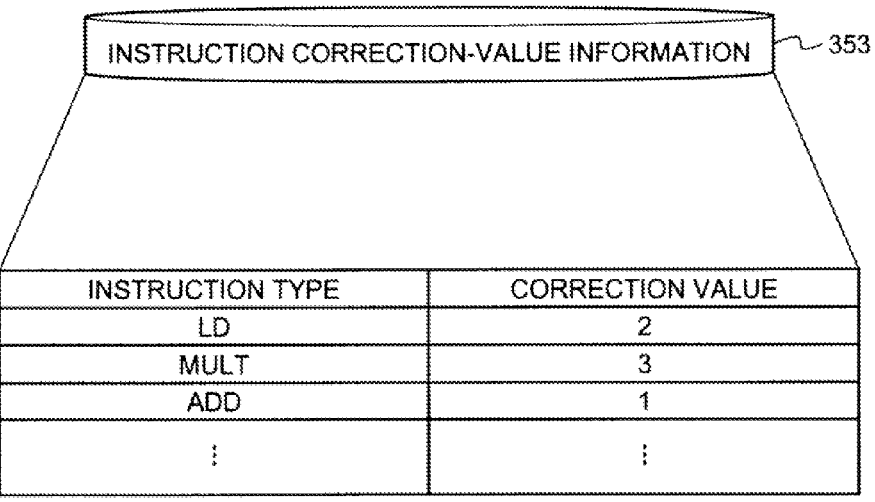
FIG. 7 is a diagram depicting an example of instruction correction-value information.

FIG. 7 is a diagram depicting an example of the instruction correction-value information. The instruction correction-value information 353 depicted in FIG. 7 has records 351-1 to 351-3. The instruction correction-value information 353 has 2 fields, including an instruction type field and a correction value field. The instruction type field indicates the operation code of an instruction. The correction value field indicates the cycle count for which a register used by the instruction is used during the e-stage. For example, record 353-1 indicates that an LD instruction uses a register for 2 cycles.

FIG. 8 is a diagram depicting an example of arithmetic unit information. The arithmetic unit information 354 depicted in FIG. 8 has records 354-1 to 354-4. The arithmetic unit information 354 has 3 fields, includes an arithmetic unit name field, a correction value field, and a count field. The arithmetic unit name field indicates the name of an arithmetic unit. The correction value field indicates the cycle count for which the arithmetic unit is used during the e-stage execution. The count field indicates the number of arithmetic units that the target CPU has. For example, record 354-1 indicates that the integer arithmetic units are used for 1 cycle during e-stage execution and the target CPU has 2 integer arithmetic units.

FIGS. 9A and 9B are diagrams depicting execution timing of the target program. FIG. 9A depicts the execution timing in a case where the execution result of an LD instruction is cache hit. FIG. 9B depicts the execution timing in a case where the execution result of the LD instruction is cache miss.

In FIG. 9A and FIG. 9B, each instruction sequentially executes the f-stage, the d-stage, and the e-stage. The f-stage and the d-stage are performed for 1 cycle irrespective of the instruction. The e-stage is performed for a cycle count that differs according to instruction. For example, concerning the number of cycles that the e-stage of each instruction takes is indicated by the correction field in the instruction correction-value information 353.

From the timing information 351, if time t is assumed to be the execution time of the e-stage of the LD instruction, the time at which each instruction is inserted in the pipeline is time t+1 for the start of execution of the e-stage of the MULT instruction and time t+2 for the start of execution of the e-stage of the ADD instruction.

The first source register (r2) and the second source register (r5) of the ADD instruction are used by the LD instruction and the MULT instruction. Therefore, the start of execution of the e-stage of the ADD instruction is time t+4 or later, after execution of the LD instruction and the MULT instruction has ended and a 2-cycle standby period (2-cycle through) occurs.

Under these conditions, in FIG. 9A, when instruction execution for block 401 is simulated and the execution result for the LD instruction is cache hit, the execution period of block 401 is the 7 cycles from time t−2 to time t+5.

FIG. 9B depicts a timing example for a case where the execution result of the LD instruction in block 401 is cache miss. When the result of the LD instruction is cache miss, a period for re-execution is set in the timing information 351 as a penalty and consequently, a penalty cycle is added as a delay period. The delay period in the embodiments is the 6-clock delay period indicated in penalty field of the timing information 351.

Therefore, execution of the second processing element (e2) is delayed until time t+7. The MULT instruction, which is executed after the LD instruction is not affected by the delay and is executed as is. However, the ADD instruction is executed at time t+8 when execution of the LD instruction ends or later, resulting in a 4-cycle standby period (4-cycle through).

Thus, as depicted in FIG. 9B, in a case where instruction execution by block 401 is simulated and the execution result of the LD instruction is cache miss, the execution period of block 401 becomes the 11 cycles from time t−2 to time t+9.

Figure 10A:
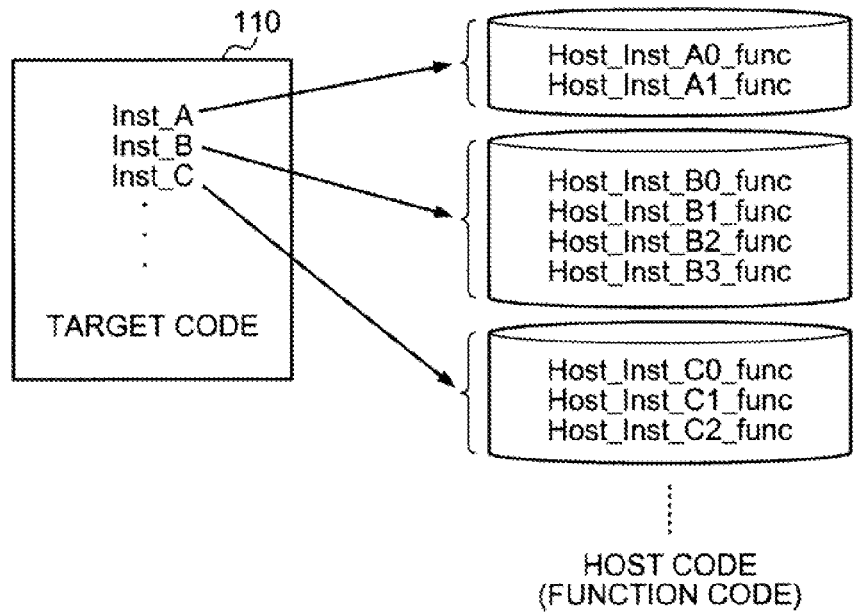
FIGS. 10A and 10B are diagrams depicting examples of host code generation.
Figure 10B:
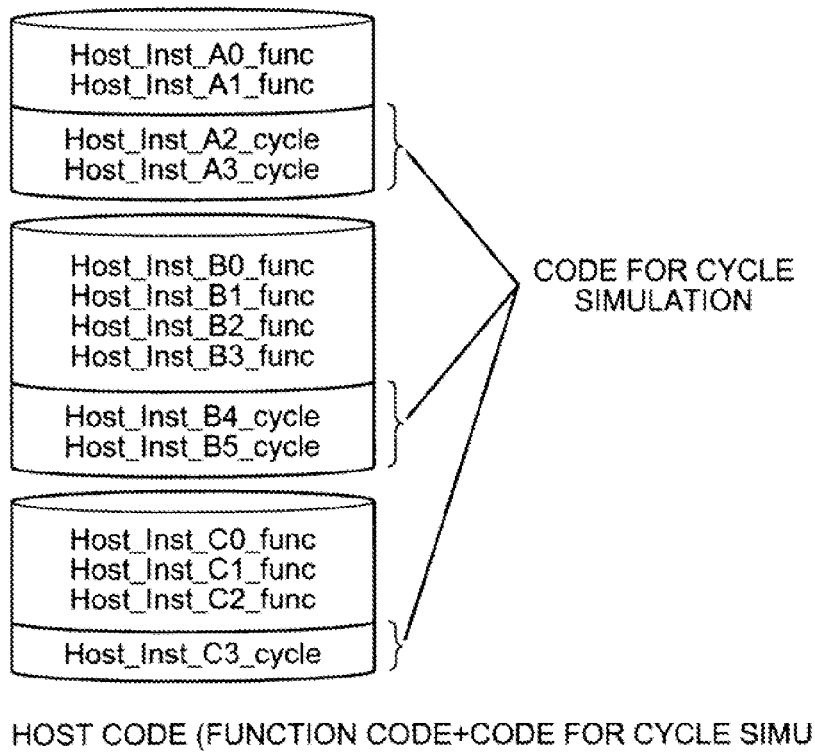

FIG. 10A and FIG. 10B are diagrams depicting examples of host code generation. With reference to FIG. 10A and FIG. 10B, examples where host code is generated from target code will be described. FIG. 10A depicts an example where function code that is used for function simulation is generated from target code. FIG. 10B depicts an example where cycle simulation code is embedded in function code. The host code includes cycle simulation code that is for obtaining function code corresponding to the target code and the execution period of the block.

As depicted in FIG. 10A, the simulation apparatus 100 generates function code from the target code. For example, target code Inst_A is converted into host code Host_Inst_A0_func and Host_Inst_A1_func. Similarly, target code Inst_B is converted into host code Host_Inst_B0_func, Host_Inst_B1_func, Host_Inst_B2_func, etc.

As depicted in FIG. 10B, the simulation apparatus 100 embeds the cycle simulation code into the function code. For example, cycle simulation code Host_Inst_A2_cycle and Host_Inst_A3_cycle of target code Inst_A is embedded after Host_Inst_A1_func. Similarly, cycle simulation code Host_Inst_B4_cycle and Host_Inst_B5_cycle of target code Inst_B is embedded after Host_Inst_B3_func. Target code Inst_C is converted similarly to target code Inst_A and target code Inst_B.

The cycle simulation code makes the execution period (given cycle count) of the e-stage of each instruction a constant, sums the execution periods of the e-stages of the instructions, and obtains the block processing period. As a result, information indicating the progress of a block under execution can be obtained.

Here, cycle simulation code concerning instructions other than function code and externally dependent instruction, among the host code can be implemented using known code and therefore, description of an example is omitted. Cycle simulation code concerning an externally dependent instruction is prepared as a helper function that calls correction processing. The helper function is described hereinafter with reference to FIG. 11.

FIG. 11 is a diagram depicting an example of process code of the first corrector. The corrector 322 (first corrector) is implemented as a helper function such as process code 1101 depicted in FIG. 11. In the embodiments, for example, in place of a conventional function "cache_ld(address)" that performs simulation for each cache execution result of an LD instruction, a helper function "cache_ld(address,rep_delay, pre_delay)" is embedded in the host code, thereby implementing the corrector 322 (first corrector).

The second argument of the helper function "rep_delay" is a period (extension period) not processed, as a delay period of the penalty period, before the execution of the e-stage of next instruction that uses the returned value of the LD instruction. The third argument of the helper function "pre_delay" is the delay period received from the preceding instruction. A "pre_delay" of "−1" indicates that the preceding instruction had no delay. The "rep_delay" and the "pre_delay" are time information obtained from the results of static analysis of the performance simulation result and the timing information 351.

The process code 1101 depicted in FIG. 11 is an example concerning an LD instruction and consequently, indicates that the pre_delay is 1-delay period of the preceding LD instruction.

In the process code 1101, current_time indicates the current time; preld_time indicates the execution time of the e-stage of the preceding LD instruction, from the current time; and avail_delay indicate the effective delay period. Cache_miss_latency indicates the penalty period for cache miss.

In FIG. 11, if the difference of current_time and preld_time is greater than pre_delay, the corrector 322 adjusts pre_delay by the period until preld_time and current_time, and obtains avail_delay. Next, if the execution result is cache miss, the predicted result is errant and the corrector 322 adds cache_miss_latency to avail_delay and based on extension period rep_delay, corrects the execution period of the e-stage of the LD instruction. FIG. 12A to FIG. 14D depict examples of correction of the execution result of the LD instruction by the corrector 322.

FIG. 12A to FIG. 12D are diagrams depicting first correction examples of execution results by the first corrector. With reference to FIG. 12A to FIG. 12D, a correction example is described where 1 cache miss occurs in a case where 1 cache process is executed.

Figure 12A:
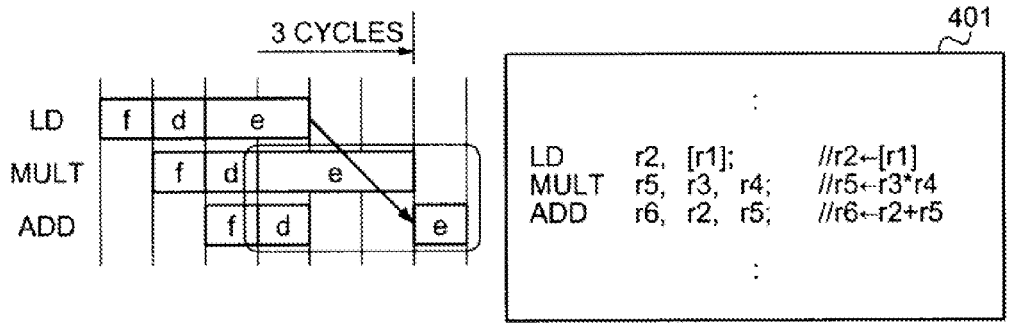
FIGS. 12A, 12B, 12C, and 12D are diagrams depicting first correction examples of execution results by the first corrector.

In the example depicted in FIG. 12A to FIG. 12D, a performance simulation of 3 instructions of block 401 is executed. FIG. 12A is a diagram depicting an example of an instruction execution timing chart in a case where the predicted result is "cache hit". In this prediction case, a 2-cycle through occurs with respect to the ADD instruction, which is executed third.

Figure 12B:
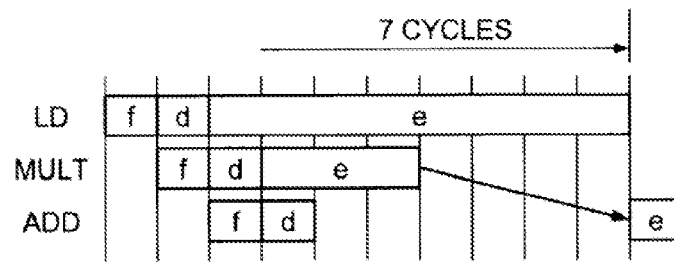

FIG. 12B is a diagram depicting an example of an instruction execution timing chart in a case of a "cache miss" that is different from the predicted result. In this case of errant prediction, the execution result of the LD instruction is cache miss and a delay of 1-penalty cycle (6 cycles) occurs. Thus, although the MULT instruction is executed without being affected by the delay, the execution of the e-stage of the ADD instruction awaits the completion of the LD instruction and therefore, is delayed by 4 cycles.

Figure 12C:
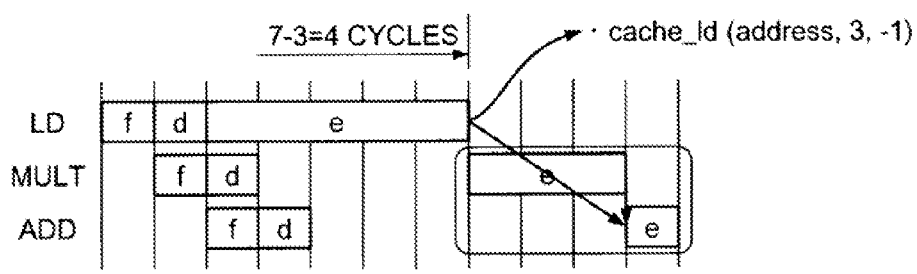

FIG. 12C is a diagram depicting an instruction execution timing chart after correction by the corrector 322. Since the execution result of the LD instruction is cache miss (predicted result error), the corrector 322 adds to the remaining execution period (2−1=1 cycle) of the e-stage, a given penalty period (6 cycles) for a case of a cache miss, thereby obtaining an effective delay period (7 cycles). The effective delay period is the maximum delay period.

The corrector 322 obtains the execution period (3 cycles) of the e-stage of the MULT instruction (which is next), determines that the execution period of the e-stage of the next instruction does not exceed the delay period and regards the difference of the effective delay period less the execution period of the e-stage of the next instruction (7−3=4 cycles) as the execution period (delay period) of an e-stage affected by the LD instruction delay. The corrector 322 regards the difference (3 cycles) of the effective delay period less the above delay period as the extension period. The extension period is the period for which delay, as a penalty, has been extended.

The corrector 322, by the helper function cache_ld(address,rep_delay,pre_delay), returns extension period rep_delay=3 and delay period pre_delay=−1 (no delay) of the preceding instruction.

By such correction, the execution period of the e-stage in the LD instruction is the execution period (1+4=5 cycles) that is the sum of the executed time and the delay period, and from time t1 when execution ends, the execution periods of the e-stages of the subsequent MULT instruction and ADD instruction are calculated.

In this manner, by adding to the corrected execution period of the e-stage in the LD instruction, the execution periods of the e-stages in the MULT instruction and the ADD instruction, obtained by a result of processing by the pre-simulation executor 312, the simulation apparatus 100 is able to obtain the block execution period. In the example depicted in FIG. 12C, the simulation apparatus 100 adds to the 5-cycle execution period of the e-stage in the LD instruction, the 3-cycle and 1-cycle execution periods of the e-stages in the MULT instruction and the ADD instruction.

Consequently, the simulation apparatus 100 performs correction processing by addition or subtraction with respect to the execution result for which the execution period of the e-stage of an instruction that differs from the prediction; and concerning the instruction, adds the e-stage execution period obtained during simulation based on the predicted result. Thus, the simulation apparatus 100 can obtain with high accuracy, an execution cycle count for a simulation in the case of cache miss.

Figure 12D:
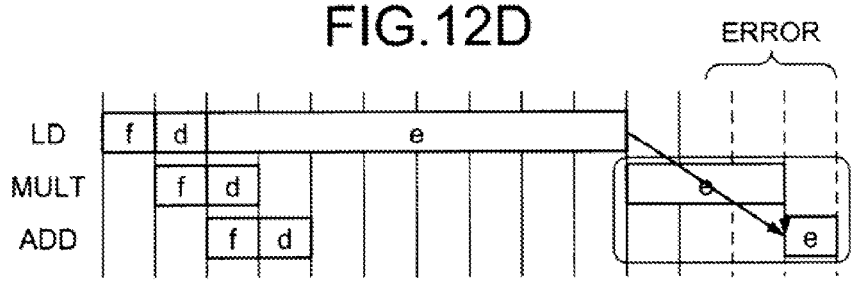

FIG. 12D is a diagram depicting (for comparison with the processing of the simulation apparatus 100) the magnitude of error when the execution time is obtained by a conventional technique of simply summing the cycle counts in the case of cache miss. In the example depicted in FIG. 12D, since the delay period of the LD instruction is summed as is, in actuality, error occurs consequent to a shift of the execution time of the MULT instruction whose execution ends during execution of the LD instruction.

FIG. 13A to FIG. 13D are diagrams depicting second correction examples of execution results by the first corrector. In FIG. 13A to FIG. 13D, correction examples are depicted where in a case where 2 cache processes are executed, 2 cache misses occur. In the examples, as depicted in block 1301, the following 5 instructions are included in the performance simulation executed.

Figure 13A:
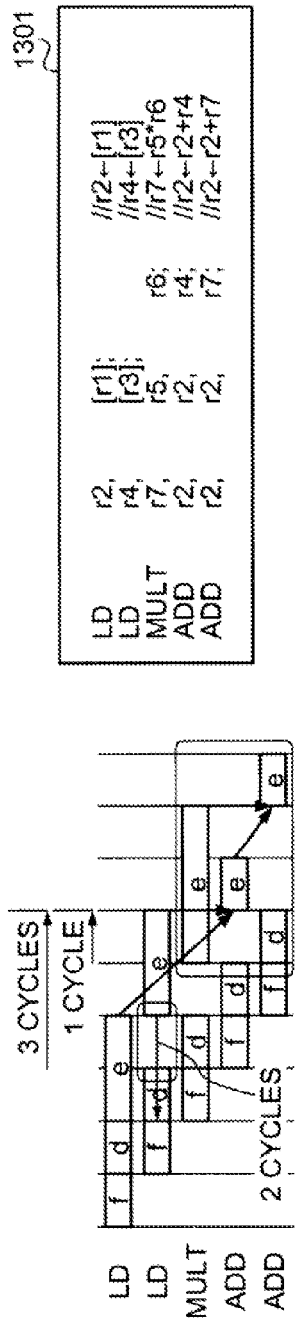
FIGS. 13A, 13B, 13C, and 13D are diagrams depicting second correction examples of execution results by the first corrector.

LD r2,[r1]; //r2←[r1];
LD r4,[r3]; //r4←[r3];
MULT r7,r5,r6; //r7←r5*r6;
ADD r2,r2,r4; //r2←r2+r4;
ADD r2,r2,r7; //r2←r2+r7;

FIG. 13A is a diagram depicting an example of an instruction execution timing chart in a case where the predicted result for 2 cache processes is "cache hit". In this prediction case, 2 LD instructions are executed with 2 cycles (the usual 1 cycle+an additional 1 cycle) therebetween.

Figure 13B:
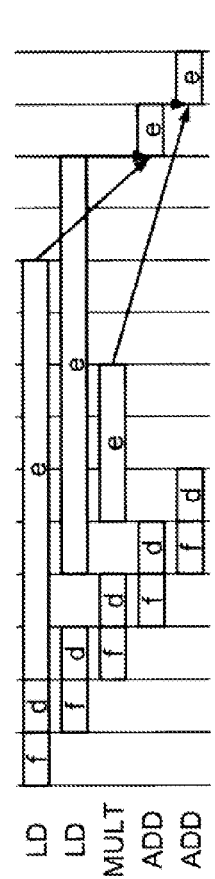

FIG. 13B is a diagram depicting an example of an instruction execution timing chart in a case where both cache processes result in a "cache miss", which is different from the predicted result. In this case of errant prediction depicted in FIG. 13B, a cache miss occurs for both of the LD instructions and delay of 1-penalty cycle (6 cycles) occurs. However, the delay period of the 2 LD instructions have a period of overlap, the e-stage of the MULT instruction is executed without being affected by the delay, and the execution of the e-stages of the 2 ADD instructions are delayed until the completion of the second LD instruction.

Figure 13C:
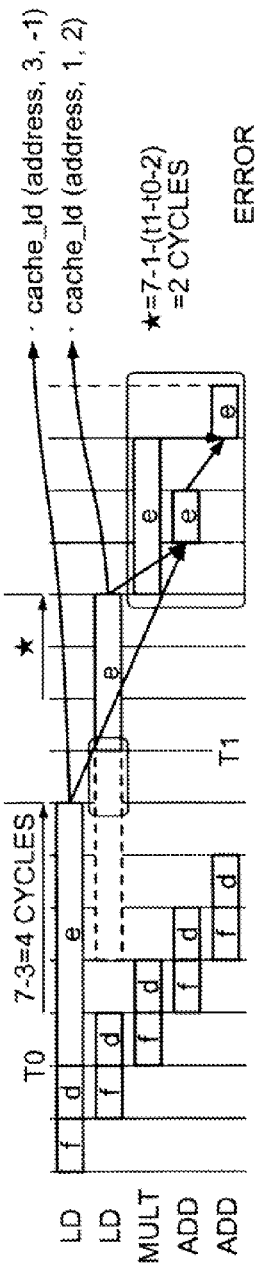

FIG. 13C is a diagram depicting an example of an instruction execution timing chart after correction by the corrector 322. The corrector 322, as described with reference to FIG. 12C, at time t0, corrects the delay period of the first LD instruction and returns helper function cache_ld(address,3,−1).

Next, at the current time t1, since the execution result of the second LD instruction is a cache miss (predicted result error), the corrector 322 adds a penalty cycle (6 cycles) to the remaining execution period of the e-stage of this LD instruction and obtains the effective delay period (1+6=7 cycles).

The corrector 322 subtracts from the effective delay period, the delay period (<current time t1−execution time t0 of e-stage of preceding instruction>−set interval) consumed up to the current time t1, obtains the effective delay period that exceeds the current time t1 (7−(6−2)=3 cycles), and regards the excess effective delay period as the execution period of the e-stage of the second LD instruction. The corrector 322 subtracts the actual execution period of the e-stage from the excess effective delay period (3−1=2 cycles) and regards the result as the delay period of the preceding instruction.

The corrector 322 subtracts from the effective delay period, the sum of the delay period consumed up to the current time t1 and the effective delay period exceeding the current time t1 (7−(3+3)=1 cycle), and regards the result as the extension period.

The corrector 322, at time t1, after correcting the delay period of the second LD instruction, returns helper function cache_ld(address,1,2). By this correction, the time that execution of the LD instruction ends is the current time t1 plus the correction value (3 cycles) and from this time (t1+3 cycles), the execution periods of the e-stages of the subsequent MULT instruction and ADD instruction are summed.

Figure 13D:
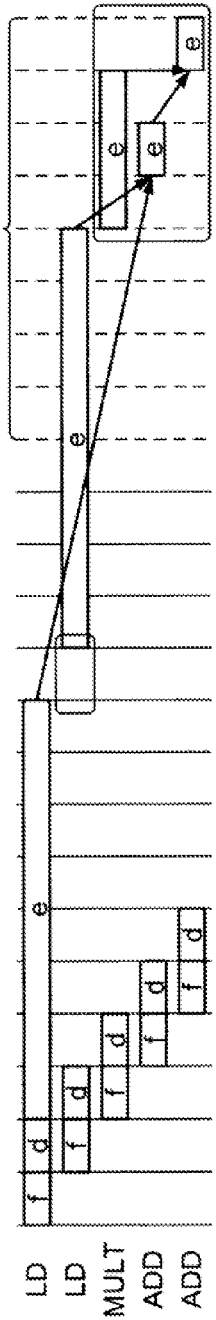

FIG. 13D is a diagram depicting (for comparison with the processing of the simulation apparatus 100) the magnitude of error when the execution time is obtained by a conventional technique of simply summing the cycle counts in the case of cache miss. In the example depicted in FIG. 13D, since the delay period, which is based on the penalty given to each of the 2 LD instructions, is summed as is, a large error (9 cycles) occurs. In the processing by the corrector 322 depicted in FIG. 13C and as depicted in FIG. 13B, although compared to correct simulation, an error (1 cycle) occurs, when compared to a conventional technique, extremely high accuracy can be obtained.

FIG. 14A to FIG. 14B are diagrams depicting third correction examples of execution results by the first corrector. In FIG. 14A to FIG. 14B, correction examples are depicted where in a case where 2 cache processes are executed, 1 cache miss occurs. In the examples, similar to the examples depicted in FIG. 13A to FIG. 13D, performance simulation of the same 5 instructions is performed.

FIG. 14A is a diagram depicting an example of an instruction execution timing chart in a case where the predicted result for 2 cache processes is "cache hit". In this prediction case, similar to the example depicted in FIG. 13A, the e-stages of the 2 LD instructions are assumed to be executed with 2 cycles (the usual 1 cycle+an additional 1 cycle) therebetween.

FIG. 14B is a diagram depicting an example of an instruction execution timing chart in a case where the first LD instruction results in "cache miss", which is different from the predicted result, and the result of the second LD instruction is the predicted result (cache hit). In this case of errant prediction depicted in FIG. 14B, a delay of 1-penalty cycle (6 cycles) occurs for the first LD instruction. However, the MULT instruction is not affected by the delay and the e-stage thereof is executed, and the execution of the e-stage in the second ADD instruction is delayed until the completion of the first LD instruction.

FIG. 14C is a diagram depicting an example of an instruction execution timing chart after correction by the corrector 322. The corrector 322, as described with reference to FIG. 12C, at time to, corrects the delay period of the first 1 LD instruction and returns helper function cache_ld(address,3,−1).

Next, at the current time t1, since the execution result of the second LD instruction is cache hit (predicted result), the corrector 322 determines that the period <t1−t0−(6−0−2=4 cycles)> from the start of execution of the e-stage in this LD instruction to the current time t1 is greater than the execution period (2 cycles) of the e-stage in this LD instruction.

Since the period from the start of execution of the e-stage of the second LD instruction until the current time t1 is greater than the execution period (2 cycle) of the e-stage in this LD instruction, the corrector 322 sets the current time t1 as the execution time of the e-stage in the MULT instruction, which is next.

The corrector 322 treats the period (2 cycles) from the completion of the execution of the second LD instruction to the current time t1 as the delay period of the next instruction and sets the delay period pre_delay=2 for the preceding instruction. The corrector 322 subtracts from the effective delay period of the first LD instruction, the sum of the delay period consumed up to the current time t1 and the effective delay period exceeding the current time t1 (7−(6+0)=1 cycle), regards the result as the extension period rep_delay=1, and returns helper function cache_ld(address,1,2).

FIG. 14D is a diagram depicting (for comparison with the processing of the simulation apparatus 100) the magnitude of error when the execution time is obtained by a conventional technique of simply summing the cycle counts in the case of cache miss. In the example depicted in FIG. 14D, since the delay period consequent to the penalty of the first LD instruction is summed as is, error occurs. FIG. 15A to FIG. 18 depict examples of execution result correction by the corrector 323 (second corrector).

Figure 15A:
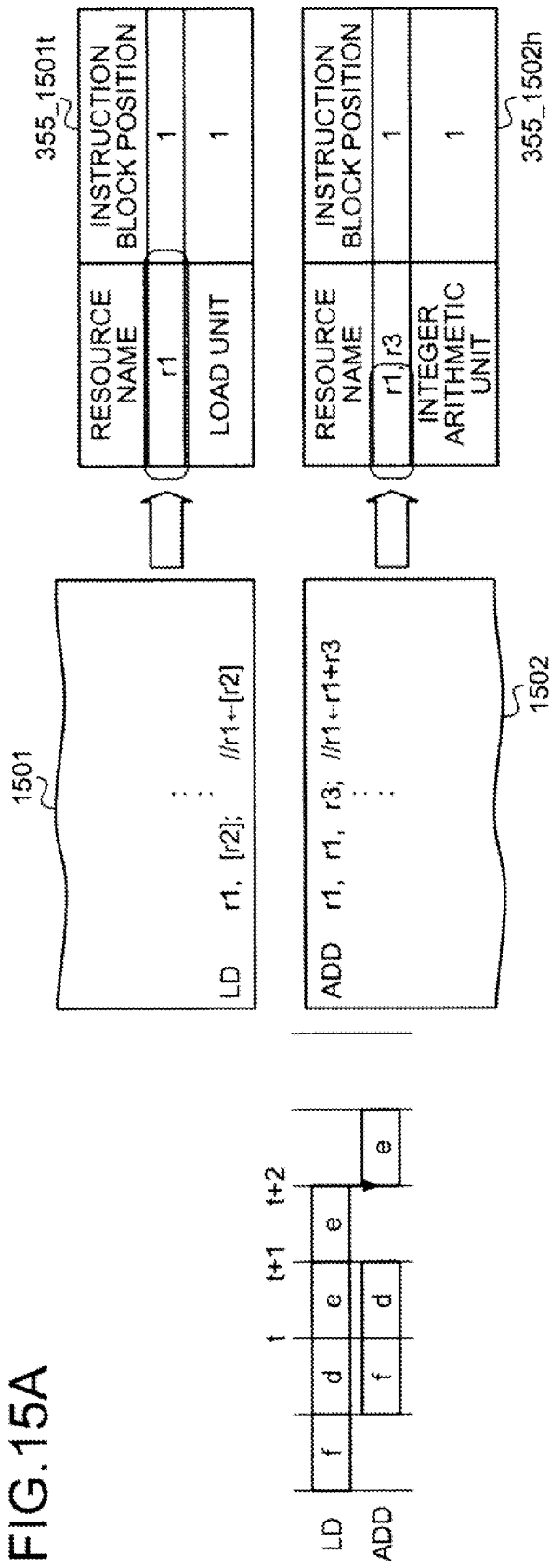
FIGS. 15A and 15B are diagrams depicting first correction examples of execution results by a second corrector.
Figure 15B:
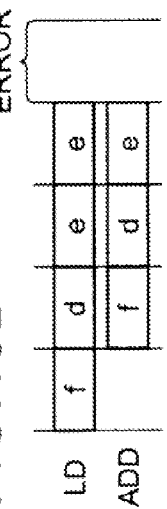

FIG. 15A and FIG. 15B are diagrams depicting first correction examples of execution results by the second corrector. In FIG. 15A and FIG. 15B, correction examples are depicted in a case where there is a register-dependency relationship between blocks and, for example, for successively executed blocks 1501 and 1502, the same register is used. Block 1501 executes "LD r1,[r2];" for the tail instruction thereof. Block 1502 executes "ADD r1,r1,r3" for the head instruction thereof. The execution time of the e-stage in the LD instruction is assumed as t.

The simulation apparatus 100 identifies the resources included in the tail instruction of a given block and the resources included in the head instruction of the preceding block that is executed before the given block. The identified resources are recorded to the block resource information 355. The simulation apparatus 100 stores to the block resource information 355_1501t, the resource group included in the LD instruction, which is the tail instruction of block 1501, and stores to the block resource information 355_1502h, the resource group included in the ADD instruction, which is the head instruction of block 1502.

The block resource information 355 is information storing the resource group included in a given number of instructions from the head or the tail of a block and the position of the resources. The block resource information 355 has 2 fields, including a resource name field and an instruction block position field. The resource name field indicates the register number or the name of the arithmetic unit is a resource. The instruction block position field indicates the position (from the head or the tail of the block) of the instruction that uses the resource.

For example, the block resource information 355_1501t indicates that, as resources, r1 (which is to be written to) and a load unit (which is to be executed) are used at the first position from the tail of block 1501. Similarly, the block resource information 355_1502h indicates that, as resources, r1 (which is to be read from and written to), r3 (which is to be read from), and an integer arithmetic unit (which is to be executed) are used at the first position from the head of block 1502.

In this manner, since r1 is commonly used, the target CPU suspends the execution of the e-stage of the ADD instruction in block 1502, until completion of the LD instruction in block 1501. The simulation apparatus 100 calculates the difference of time t+1 when r1 is used by the ADD instruction and time t+2 when use of r1 by the LD instruction ends (1 cycle) as the delay period.

In this state, in FIG. 15A, when the instruction execution by block 1502 is simulated after the execution of block 1501, the period from the f-stage of the LD instruction at the tail of block 1501 until the completion of the e-stage of ADD instruction is 5 cycles. For example, the simulation apparatus 100 corrects the execution time of the e-stage in the ADD instruction to time t+2, which is the result of adding the delay period of 1 cycle. The simulation apparatus 100 further corrects the execution time of subsequent instructions by adding 1 cycle.

FIG. 15B is a diagram depicting (for comparison with the processing of the simulation apparatus 100) the magnitude of error when the execution time is obtained by a conventional technique in a case where there is a register-dependency relationship between blocks. In the example depicted in FIG. 15B, error occurs because suspension of the execution of the e-stage of the ADD instruction consequent to the register-dependency relationship is not considered.

FIG. 16 is a diagram depicting a second correction example of execution results by the second corrector. FIG. 16 depicts an example where the target CPU is a superscalar processor and there is a register-dependency relationship. If the target CPU is a superscalar processor, the target CPU can execute multiple instructions simultaneously. Therefore, the simulation apparatus 100 sets the number of instructions that the target CPU can simultaneously execute as a given count of instructions designated from the head of an executed block. In the example depicted in FIG. 16, the target CPU is assumed to be able to execute 2 instructions simultaneously. Further, in the example depicted in FIG. 16, 2 or more load units and integer arithmetic units are assumed. The execution time of the e-stage in the first LD instruction is assumed as t.

Block 1601 and block 1602 are further assumed to be successively executed. Block 1601 executes "LD r1,[r2];" as the instruction second from the tail and "LD r3,[r4];" as the tail instruction. Block 1602 executes "ADD r1,r1,r5" as the head instruction and "ADD r3,r3,r5" as the instruction second from the head.

The simulation apparatus 100 detects the resource group designated by the tail instruction and the instruction second from the tail of block 1601 and stores the detected resource group to the block resource information 355_1601t. The simulation apparatus 100 identifies the resource group designated by the head instruction and the instruction second from the head of block 1602 and stores the identified resource group to the block resource information 355_1602h. To indicate that block 1601 and block 1602 commonly use r1 and r3, the target CPU suspends the execution of the e-stage of the second ADD instruction in block 1602 until the completion of the second LD instruction in block 1601.

Since there are multiple resources that are commonly used, the simulation apparatus 100, among r1 and r3, designates the resource for which the difference of the time of use by the head instruction and the time of completion of use by the tail instruction, is largest. In this example, for r1 and r3, time t+1 (which is the time of use by the ADD instruction) is subtracted from time t+2 (which is the time of completion of use by the LD instruction), and the difference for r1 and r3 is 1 cycle. Therefore, the simulation apparatus 100 calculates the delay period as 1 cycle.

Under these conditions, in FIG. 16 as indicated by (A), when the instruction execution by block 1602 is simulated after block 1601, the period from the f-stage in the LD instruction second from the tail of block 1601 until the completion of the e-stage in the second ADD instruction is 5 cycles. For example, the simulation apparatus 100 adds 1 cycle to the execution time of the e-stage in the ADD instruction (time t+1) and corrects the execution time to time t+2.

Figure 17:
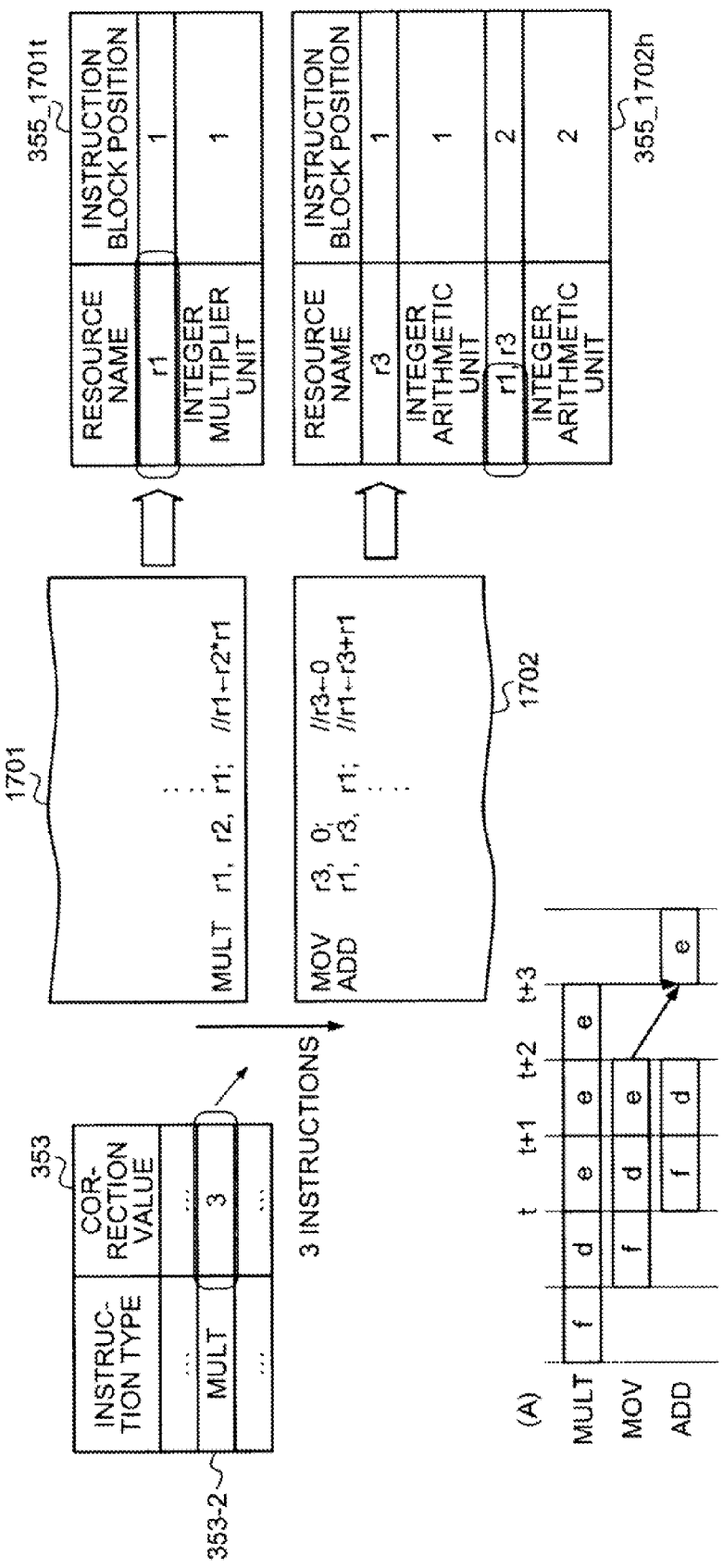
FIG. 17 is a diagram depicting a third correction example of execution results by the second corrector.

FIG. 17 is a diagram depicting a third correction example of execution results by the second corrector. FIG. 17 depicts a correction example where in an instruction having a long execution period, there is a register-dependency relationship. Herein an example will be described where in successively executed blocks 1701 and 1702, the same register is used and in block 1701, an instruction having a long execution period is executed. Further, in the example depicted in FIG. 17, a MULT instruction is executed as the instruction having the long execution period. The execution time of the e-stage in the MULT instruction is assumed as t.

Block 1701 executes "MULT r1,r2,r1;" for the tail instruction. Block 1702 executes "MOV r3,0;" for the head instruction and "ADD r1,r3,r1;" for the instruction second from the head. An MOV instruction is an instruction performing data copying.

The simulation apparatus 100 detects the resource group designated by the tail instruction of block 1701 and stores the detected resource group to the block resource information 355_1701t. The simulation apparatus 100 identifies the resource group designated by the head instruction and the instruction second from the head of block 1702 and stores the identified resource group to the block resource information 355_1702h. Since block 1701 and block 1702 are indicated to commonly use r1, the target CPU suspends the execution of the e-stage of the ADD instruction in block 1702 until completion of the MULT instruction in block 1701. The simulation apparatus 100 calculates, as the delay period, the difference of time t+2 when r1 is used by the ADD instruction and time t+3 when use of r1 by the MULT instruction ends (1 cycle).

Under these conditions, in FIG. 17 as indicated by (A), when the instruction execution by block 1702 is simulated after block 1701, the period from the f-stage of the tail MULT instruction of block 1701 until the completion of the e-stage of the ADD instruction is 6 cycles. For example, the simulation apparatus 100 adds 1 cycle to the execution time of the e-stage in the ADD instruction (time t+2) and corrects the execution time to time t+3.

Figure 18:
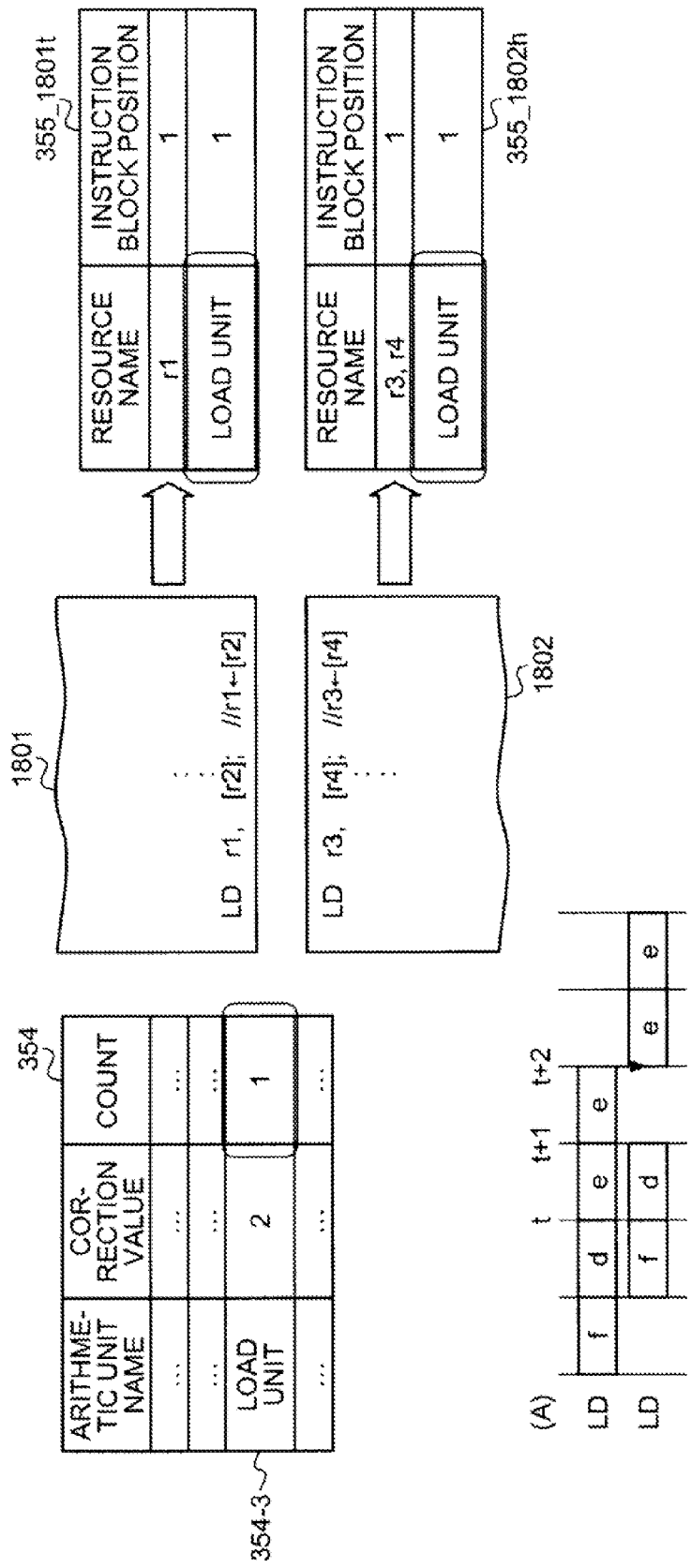
FIG. 18 is a diagram depicting a fourth correction example of execution results by the second corrector.

FIG. 18 is a diagram depicting a fourth correction example of execution results by the second corrector. FIG. 18 depicts a correction example where there is an arithmetic unit-dependency relationship between successively executed blocks. For example, successively executed blocks 1801 and 1802 use a load unit. The execution time of the e-stage in an LD instruction of block 1801 is assumed as t.

Block 1801 executes "LD r1,[r2];" for the tail instruction. Block 1802 executes "LD r3,[r4];" for the head instruction. The simulation apparatus 100 detects the resource group designated by the tail instruction of block 1801 and stores the detected resource group to the block resource information 355_1801t. The simulation apparatus 100 identifies the resource group designated by the head instruction of block 1802 and stores the identified resource group to the block resource information 355_1802h.

As indicated by record 354-3, the number of load units possessed by the target CPU is 1 and therefore, the target CPU suspends the execution of the e-stage of the LD instruction in block 1802 until completion of the LD instruction in block 1801. The simulation apparatus 100 calculates, as the delay period, the difference of time t+1 when the load unit is used by the LD instruction in block 1802 and time t+2 when use of the load unit by the LD instruction in block 1801 ends (1 cycle).

Under these conditions, in FIG. 18 as depicted by (A), when the instruction execution by block 1802 is simulated after block 1801, the period from the f-stage of the LD instruction in block 1801 until the completion of the e-stage of the LD instruction in block 1802 is 6 cycles. For example, the simulation apparatus 100 adds 1 cycle to the execution time of the e-stage of the LD instruction in block 1802 (time t+1) and corrects the execution time to time t+2.

The corrector 323 (second corrector) performs the correction depicted in FIG. 15A to FIG. 18 in a case where the predicted branch result is acquired and the prediction is on target when the tail instruction of the preceding block has a branch instruction. If the prediction is not on target, the corrector 323 does not perform the correction depicted in FIG. 15A to FIG. 18 because the effects of the errant prediction are great.

FIG. 19 is a flowchart of an example of code converter processing. The simulation apparatus 100 divides target code into given blocks and inputs a block (step S1901). The simulation apparatus 100 analyzes the instructions of the input block and detects an externally dependent instruction (step S1902). For each detected instruction, the simulation apparatus 100 sets a predicted result of a high probability, based on the prediction information 352 (step S1903).

After setting the predicted results, the simulation apparatus 100 refers to the timing information 351, and for each instruction of the block, executes a performance simulation using the predicted result as a premise (step S1904). The simulation apparatus 100 writes to the block resource information 355, a resource group designated by a given number of instructions from the head of the block and a resource group designated by a given number of instructions from the tail of the preceding block (step S1905).

The simulation apparatus 100, based on the simulation result, generates host code for performance simulation (step S1906). By the processes at step S1901 to step S1904 and step S1906, the simulation apparatus 100 outputs to function code that is for a case of the set predicted results, the host code embedded with code simulating the performance of the target CPU.

FIG. 20 is a flowchart of an example of simulation executor processing. The simulation apparatus 100 acquires the host code for performance simulation (step S2001), and executes performance simulation by executing the host code (step S2002). The simulation apparatus 100, upon detecting an externally dependent instruction during execution of the performance simulation (step S2003), determines whether the execution result of the externally dependent instruction is identical to the predicted result (step S2004).

If the execution result of the externally dependent instruction is not identical to the predicted result (step S2004: NO), the simulation apparatus 100 corrects the execution period of the instruction via the corrector 322 (step S2005). After correcting the execution period of the instruction or if the execution result of the externally dependent instruction is identical to the predicted result (step S2004: YES), the simulation apparatus 100 executes correction processing between blocks (step S2006). Details of the correction processing between blocks will be described hereinafter with reference to FIG. 22. The simulation apparatus 100 outputs the simulation data 356 concerning the simulation processing for all of the host code corresponding to the target program (step S2007).

By the processing at step S2001 to step S2007, the simulation apparatus 100 outputs the simulation data 356 of the target CPU that executes the target program 101.

FIG. 21 is a flowchart of a first simulation result correction process. In FIG. 21, an example of correction processing with respect to an LD instruction, as an example of an externally dependent instruction, will be described. The simulation apparatus 100, upon detecting an externally dependent instruction among the instructions of the block under test, calls a helper function corresponding to the corrector 322 (step S2101).

The simulation apparatus 100 determines whether cache access is requested by the LD instruction (step S2102). If cache access is requested (step S2102: YES), the simulation apparatus 100 simulates cache access execution (step S2103).

The simulation apparatus 100 judges the cache access result (step S2104). If the cache access result is "cache miss" (step S2104: "miss"), the simulation apparatus 100 corrects the execution period (cycle count) of the e-stage in the LD instruction (step S2105). The simulation apparatus 100 outputs the corrected execution period (cycle count) (step S2106).

If cache access is not requested (step S2102: NO), or if the requested cache access result is "cache hit" (step S2104: "hit"), the simulation apparatus 100 outputs the predicted execution period (cycle count) without correction (step S2107).

FIG. 22 is a flowchart of a second simulation result correction process. The simulation apparatus 100 acquires the execution time of an instruction in the block under test (step S2201). The simulation apparatus 100 determines whether a branch instruction is present in the tail instruction of the preceding block (step S2202). If a branch instruction is present (step S2202: YES), the simulation apparatus 100 acquires the predicted branch result of performance simulation for branch prediction (step S2203).

The simulation apparatus 100 determines whether predicted branch result is on target (step S2204). If the predicted branch result is on target (step S2204: YES), or if no branch instruction is present (step S2202: NO), the simulation apparatus 100 detects a first resource group that is designated by the tail instruction of the preceding block and a second resource group that is designated by the head instruction of the block under test (step S2205). At step S2205, the simulation apparatus may detect, as the first resource group, a register group designated by the tail instruction of the preceding block to be written to and may further detect, as the second resource group, a storage area group designated by the head instruction of the block under test to be read from or written to.

The simulation apparatus 100 identifies a resource common to the first and the second resource groups (step S2206). At step S2206, the simulation apparatus, may identify among resources common to the first and the second resource groups, a resource for which the difference of the time when the resource is used by the head instruction and the time when use of the resource by the tail instruction ends is greatest. Further, at step S2206, if the common resource is an arithmetic unit and the number of arithmetic units that the target CPU has is less than the number designated by the tail instruction and the head instruction, the simulation apparatus may identify the arithmetic unit.

The simulation apparatus 100 determines whether a resource has been identified (step S2207). If a resource has been identified (step S2207: YES), the simulation apparatus 100 calculates a delay period from the time when the identified resource is used by the head instruction and the time when use of the identified resource by the tail instruction ends (step S2208). After calculation of the delay period, the simulation apparatus 100 corrects the execution time of the instruction of the block under test, by the delay period (step S2209), outputs the corrected execution time of the instruction of the block under test (step S2210), and ends the correction processing between blocks.

If the predicted branch result is not on target (step S2204: NO), or if no resource is identified (step S2207: NO), the simulation apparatus 100 outputs the execution time of the instruction of the block under test (step S2211), and ends the correction processing between blocks.

As described, the correction apparatus, the correction method, and the computer product identify resources commonly used between blocks obtained by dividing program code; and use the time when the conflicting resources are used and the time when the resources become available to correct the cycle count. Consequently, the correction apparatus can improve the accuracy of performance simulation.

The correction method of resources conflicting between blocks simply adds the delay period to the execution time of each instruction and therefore, does not increase the time consumed for simulation and can improve the accuracy.

When the tail instruction of the preceding block is a branch instruction and the predicted branch result is on target, the correction apparatus may perform correction between blocks. Concerning influences on simulation results, when the branch prediction is inaccurate, the influence of a prediction error is greater than the influence between blocks and therefore, the correction apparatus is able to perform correction between blocks when the influence between block is great.

Among resources common between the first and the second resource group, the correction apparatus may identify the resource having the largest difference between the time when the resource is used by the head instruction and the time when used by the tail instruction. Consequently, since the correction apparatus identifies the resource having the greatest effect on the simulation result between blocks, the correction apparatus can further improve the accuracy of performance simulation.

The correction apparatus may detect, as the first resource group, storage areas designated by the tail instruction to be written to. Consequently, the correction apparatus simply regards, as the first resource group, storage areas designated by the tail instruction to be written to and thereby, can reduce the number of the first resource group to the number of storage areas to be read from and can increase the speed of the common resource identification processing.

When the common resource is an arithmetic unit and the number of arithmetic units that the target CPU has is less than the number designated by the tail instruction and the head instruction, the correction apparatus may identify the arithmetic unit. Thus, with the number of arithmetic units being sufficient, the correction apparatus can eliminate cases where the correction between blocks is not necessary.

In the simulation apparatus 100 according to the first embodiment, performance simulation was executed. The simulation apparatus 100 according to a second embodiment performs power simulation. The simulation apparatus according to the second embodiment has hardware identical to the simulation apparatus according to the first embodiment and therefore, description thereof is omitted. With the exception of the acquirer 331, the corrector 336, and the output device 337, the simulation apparatus according to the second embodiment has the same functions as the simulation apparatus according to the first embodiment and therefore, description thereof is omitted. The simulation apparatus according to the second embodiment has access to power information that indicates power consumed by an instruction. With reference to FIG. 23, an example of power simulation correction and power information will be described in detail hereinafter.

The acquirer 331 according to the second embodiment has a function of acquiring the execution times and power consumption of instructions in a block that is included in a block group that includes blocks obtained by dividing program code. For example, according to the second embodiment, the acquirer 331 acquires the execution time t+1 of the ADD instruction in block 103 and the power consumption 0.3[uW] of the ADD instruction. Acquisition results are retained in a storage area such as the RAM 203, the magnetic disk 205, and the optical disk 207.

The corrector 336 according to the second embodiment has a function of correcting, based on the delay period calculated by the calculator 335, the power consumed by the execution of an instruction in a block, as acquired by the acquirer 331 according to the second embodiment. For example, if the delay period is 2 cycles, the corrector 336 according to the second embodiment adds 2×0.05[uW] to the power 0.3[uW] consumed by the ADD instruction.

The output device 337 according to the second embodiment has a function of outputting the power consumption corrected by the corrector 336 according to the second embodiment. For example, the output device 337 according to the second embodiment outputs the corrected power consumption 0.3+2×0.05=0.31[uW] of the ADD instruction.

FIG. 23 is a diagram depicting an example of correction by the simulation apparatus according to the second embodiment. FIG. 23 depicts an example of a case where a function (power simulation function) is embedded in host code for performance simulation.

As power information 2301 indicating the power consumed by instructions, the power consumption for 1 execution of an LD instruction, a MULT instruction, and an ADD instruction are set as 0.3[uW], 0.5[uW], 0.3[uW], respectively. A power simulation function Host_Inst_A-C_power calculates the power based on the execution count of each instruction executed during the simulation.

For example, if the delay period consequent to the preceding block is 1 cycle, the power simulation function adds the power consumption 0.05[uW] for 1 cycle to the power 0.3 [uW] consumed by the ADD instruction and thereby, corrects the power consumed by the ADD instruction.

The flow of the correction processing according to the second embodiment is substantially equivalent to that depicted in FIG. 22 and therefore, depiction thereof is omitted. One variation from the flow depicted in FIG. 22 is that at step S2201, "the simulation apparatus acquires the execution time and the power consumption of an instruction in the block under test". Further, at step S2209, "the simulation apparatus corrects the power consumption of the instruction of the block under test, by the delay period"; and at step S2210, "the simulation apparatus outputs the corrected power consumption of the instruction of the block under test.

As described, the correction apparatus, the correction method, and computer product enable more accurate power consumption simulation that considers the power consumed during the through periods of the pipeline.

The correction method described in the embodiments may be implemented by executing a prepared program on a computer such as a personal computer and a workstation. The program is stored on a computer-readable medium such as a hard disk, a flexible disk, a CD-ROM, an MO, and a DVD, read out from the recording medium, and executed by the computer. The program may be distributed through a network such as the Internet. However, the computer-readable medium does not include a transitory medium such as a propagation signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A correction apparatus comprising:
   an acquirer that acquires the execution time of an instruction in a given block among a block group that includes blocks obtained by dividing program code;
   a detector that detects a first resource group designated by a tail instruction in a preceding block that is executed before the given block and a second resource group designated by a head instruction of the given block;
   an identifier that, when a resource common to the detected first resource group and the detected second resource group is an arithmetic unit and arithmetic units of a CPU (Central Processing Unit) that is subject to simulation by the program code is of a number that is less than the number of arithmetic units designated by the tail instruction and the head instruction, identifies the arithmetic unit;
   a calculator that from the time when the identified arithmetic unit is used by the head instruction and the time when use of the identified arithmetic unit by the tail instruction ends, calculates a delay period caused by the preceding block;
   a corrector that corrects the acquired execution time of the instruction in the given block based on the delay period calculated by the calculator; and
   an output device that outputs the corrected execution time.

2. The correction apparatus according to claim 1 and further comprising
   a determiner that when the tail instruction is branch instruction, determines whether a predicted branch result is on target with an execution result of a simulation of the tail instruction, wherein
   the acquirer acquires the predicted branch result of the tail instruction, and
   the detector detects the first resource group and the second resource group when the branch prediction of the tail instruction is determined to be on target by the determiner.

3. The correction apparatus according to claim 1, wherein
   the identifier identifies among resources common to the detected first resource group and the detected second resource group, an arithmetic unit for which the difference the time when the arithmetic unit is used by the head instruction and the time when use of the arithmetic unit by the tail instruction ends is greatest.

4. The correction apparatus according to claim 1, wherein
   the output device outputs the acquired execution time of the instruction in the given block when no arithmetic unit is identified by the identifier.

5. The correction apparatus according to claim 1, wherein
   the detector detects as the first resource group, a storage area group designated by the tail instruction of the preceding block to be written to and detects as the second resource group, a storage group designated by the head instruction of the given block to be read from or written to.

6. The correction apparatus according to claim 1, wherein
   the acquirer acquires power consumption by the instruction,
   the corrector, based on the calculated delay period, corrects the acquired power consumption of the instruction in the given block, and
   the output device outputs the corrected power consumption.

7. The correction apparatus according to claim 6 and further comprising
   a determiner that when the tail instruction is branch instruction, determines whether a predicted branch result is on target with an execution result of a simulation of the tail instruction, wherein
   the acquirer acquires the predicted branch result of the tail instruction, and
   the detector detects the first resource group and the second resource group when the branch prediction of the tail instruction is determined to be on target by the determiner.

8. The correction apparatus according to claim 6, wherein
   the identifier identifies among resources common to the detected first resource group and the detected second resource group, an arithmetic unit for which the difference the time when the arithmetic unit is used by the head instruction and the time when use of the arithmetic unit by the tail instruction ends is greatest.

9. The correction apparatus according to claim 6, wherein
   the detector detects as the first resource group, a storage area group designated by the tail instruction of the preceding block to be written to and detects as the second resource group, a storage group designated by the head instruction of the given block to be read from or written to.

10. A correction method executed by a computer, the correction method comprising:
    acquiring the execution time of an instruction in a given block among a block group that includes blocks obtained by dividing program code;
    detecting a first resource group designated by a tail instruction in a preceding block that is executed before the given block and a second resource group designated by a head instruction of the given block;
    identifying, when a resource common to the detected first resource group and the detected second resource group is an arithmetic unit and arithmetic units of a CPU (Central Processing Unit) that is subject to simulation by the program code is of a number that is less than the number of arithmetic units designated by the tail instruction and the head instruction, the arithmetic unit;
    calculating from the time when the identified arithmetic unit is used by the head instruction and the time when use of the identified arithmetic unit by the tail instruction ends, a delay period caused by the preceding block;
    correcting the acquired execution time of the instruction in the given block based on the delay period calculated by the calculating; and
    outputting the corrected execution time.

11. The correction method according to claim 10, wherein
    the acquiring includes acquiring power consumption by the instruction,
    the correcting includes correcting based on the calculated delay period, the acquired power consumption of the instruction in the given block, and
    the outputting includes outputting the corrected power consumption.

12. A non-transitory computer-readable medium storing therein a correction program that causes a computer to execute a process, the process comprising:

acquiring the execution time of an instruction in a given block among a block group that includes blocks obtained by dividing program code;

detecting a first resource group designated by a tail instruction in a preceding block that is executed before the given block and a second resource group designated by a head instruction of the given block;

identifying, when a resource common to the detected first resource group and the detected second resource group is an arithmetic unit and arithmetic units of a CPU (Central Processing Unit) that is subject to simulation by the program code is of a number that is less than the number of arithmetic units designated by the tail instruction and the head instruction, the arithmetic unit;

calculating from the time when the identified arithmetic unit is used by the head instruction and the time when use of the identified arithmetic unit by the tail instruction ends, a delay period caused by the preceding block;

correcting the acquired execution time of the instruction in the given block based on the delay period calculated by the calculating; and outputting the corrected execution time.

13. The computer-readable medium according to claim 12, wherein the acquiring includes acquiring power consumption by the instruction, the correcting includes correcting based on the calculated delay period, the acquired power consumption of the instruction in the given block, and the outputting includes outputting the corrected power consumption.

* * * * *